(12) United States Patent
Ike et al.

(10) Patent No.: US 7,924,465 B2
(45) Date of Patent: Apr. 12, 2011

(54) DITHER MATRIX, IMAGE PROCESSING METHOD, STORAGE MEDIUM, IMAGE PROCESSING APPARATUS, IMAGE FORMING APPARATUS, AND IMAGE FORMING SYSTEM

(75) Inventors: Takahiro Ike, Tokyo (JP); Masakazu Yoshida, Kanagawa (JP); Takashi Kimura, Kanagawa (JP); Masanori Hirano, Kanagawa (JP); Shigetoshi Hosaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 957 days.

(21) Appl. No.: 11/794,286

(22) PCT Filed: Nov. 1, 2006

(86) PCT No.: PCT/JP2006/322325
§ 371 (c)(1),
(2), (4) Date: Jun. 25, 2007

(87) PCT Pub. No.: WO2007/052832
PCT Pub. Date: May 10, 2007

(65) Prior Publication Data
US 2008/0123146 A1 May 29, 2008

(30) Foreign Application Priority Data

Nov. 1, 2005 (JP) ................................. 2005-318669
Oct. 12, 2006 (JP) ................................. 2006-279108

(51) Int. Cl.
*H04N 1/40* (2006.01)
*H04N 1/405* (2006.01)
*G06K 15/00* (2006.01)

(52) U.S. Cl. ...... 358/3.06; 358/1.9; 358/3.07; 358/3.08; 358/3.1; 358/3.13; 358/3.14; 358/3.16; 358/3.17; 358/3.18; 358/3.19; 358/3.22; 382/162; 382/167; 347/10; 347/11; 347/12; 347/14; 347/19

(58) Field of Classification Search ........................ None
See application file for complete search history.

(56) References Cited

U.S. PATENT DOCUMENTS 4,795,284 A 1/1989 Yumoto et al.
(Continued)

FOREIGN PATENT DOCUMENTS

JP 61-43074 3/1986
(Continued)

OTHER PUBLICATIONS

Mar. 4, 2009 European search report in connection with a counterpart European patent Application No. 06 82 3221.
(Continued)

*Primary Examiner* — Mark K Zimmerman
*Assistant Examiner* — Miya J Cato
(74) *Attorney, Agent, or Firm* — Cooper & Dunham LLP

(57) ABSTRACT

A disclosed dither matrix is used in halftone processing for converting input image data having M input halftone levels into output image data having N (M>N>2) output halftone levels. In the halftone processing, a concentration type dither matrix is used as the dither matrix when an input halftone level is within a range of input halftone levels corresponding to an output halftone level that is lower than a predetermined threshold level T (N>T>1), and a dispersion type dither matrix is used as the dither matrix when the input halftone level is within a range of input halftone levels corresponding to an output halftone level that is equal to or higher than the predetermined threshold level T.

15 Claims, 21 Drawing Sheets

U.S. PATENT DOCUMENTS

| | | | | |
|---|---|---|---|---|
| 4,897,736 | A | * | 1/1990 | Sugino ............................ 358/1.9 |
| 4,990,939 | A | | 2/1991 | Sekiya et al. |
| 5,101,283 | A | * | 3/1992 | Seki et al. ..................... 358/3.13 |
| 5,172,139 | A | | 12/1992 | Sekiya et al. |
| 5,293,182 | A | | 3/1994 | Sekiya et al. |
| 5,389,962 | A | | 2/1995 | Sekiya et al. |
| 5,400,065 | A | | 3/1995 | Tomono et al. |
| 5,412,413 | A | | 5/1995 | Sekiya et al. |
| 5,600,356 | A | | 2/1997 | Sekiya et al. |
| 5,815,286 | A | | 9/1998 | Matsuba et al. |
| 6,174,056 | B1 | * | 1/2001 | Sakaki et al. ................... 347/100 |
| 6,191,868 | B1 | * | 2/2001 | Shibuya et al. ................. 358/1.9 |
| 6,578,944 | B1 | | 6/2003 | Kamei et al. |
| 6,714,320 | B1 | * | 3/2004 | Nakahara et al. ............ 358/3.13 |
| 6,923,520 | B2 | | 8/2005 | Oikawa et al. |
| 7,083,247 | B2 | | 8/2006 | Yoshida et al. |
| 2004/0160643 | A1 | * | 8/2004 | Sugizaki ...................... 358/3.06 |
| 2004/0218221 | A1 | * | 11/2004 | Hirano et al. ................. 358/3.06 |
| 2006/0051528 | A1 | * | 3/2006 | Ogino et al. ................. 428/32.21 |
| 2008/0117467 | A1 | * | 5/2008 | Hosaka et al. ............... 358/3.06 |

FOREIGN PATENT DOCUMENTS

| | | |
|---|---|---|
| JP | 5-244400 | 9/1993 |
| JP | 8-160602 | 6/1996 |
| JP | 8-262693 | 10/1996 |
| JP | 9-37076 | 2/1997 |
| JP | 9-99628 | 4/1997 |
| JP | 10-210292 | 8/1998 |
| JP | 2003-46777 | 2/2003 |
| JP | 2003-327880 | 11/2003 |
| JP | 2005-1221 | 1/2005 |
| JP | 2005-175949 | 6/2005 |

OTHER PUBLICATIONS

U.S. Appl. No. 07/880,163, filed May 5, 1992.

* cited by examiner

SMALL-SIZE DOT DITHER MATRIX 701

SUBMATRIX 711

| 341 | 301 | 261 | 221 | 181 | 151 | 111 | 71 | 121 | 281 | 367 | 387 | 343 | 173 | 213 | 253 | 293 | 333 | 269 | 109 | 9 | 19 | 49 | 209 | 249 | 289 | 329 | 249 | 209 | 169 | 139 | 99 | 59 | 149 | 309 | 349 | 179 | 219 | 259 | 299 | 339 |

FIG.14

| | CONCENTRATION TYPE | DISPERSION TYPE |
|---|---|---|
| 1 | 34 30 26 22 18 35 36 37<br>17 14 10 6 15 31 38 39<br>21 5 0 2 11 27<br>25 9 1 3 7 23<br>29 13 4 8 12 19<br>33 16 20 24 28 32 | 0 20 5 25 3 23 9 29<br>30 10 35 15 33 13 39 19<br>8 28 4 24 6 26<br>38 18 37 14 36 16<br>2 22 7 27 1 21<br>31 12 37 17 31 11 |
| 2 | 34 30 26 22 18 35 36 37<br>17 14 10 6 15 31 38 39<br>21 5 0 2 11 27<br>25 9 1 3 7 23<br>29 13 4 8 12 19<br>33 16 20 24 28 32 | 0 20 5 25 3 23 9 29<br>30 10 35 15 33 13 39 19<br>8 28 4 24 6 26<br>38 18 37 14 36 16<br>2 22 7 27 1 21<br>31 12 37 17 31 11 |
| 3 | 34 30 26 22 18 35 36 37<br>17 14 10 6 15 31 38 39<br>21 5 0 2 11 27<br>25 9 1 3 7 23<br>29 13 4 8 12 19<br>33 16 20 24 28 32 | 0 20 5 25 3 23 9 29<br>30 10 35 15 33 13 39 19<br>8 28 4 24 6 26<br>38 18 37 14 36 16<br>2 22 7 27 1 21<br>31 12 37 17 31 11 |
| 4 | 34 30 26 22 18 35 36 37<br>17 14 10 6 15 31 38 39<br>21 5 0 2 11 27<br>25 9 1 3 7 23<br>29 13 4 8 12 19<br>33 16 20 24 28 32 | 0 20 5 25 3 23 9 29<br>30 10 35 15 33 13 39 19<br>8 28 4 24 6 26<br>38 18 37 14 36 16<br>2 22 7 27 1 21<br>31 12 37 17 31 11 |
| 5 | 34 30 26 22 18 35 36 37<br>17 14 10 6 15 31 38 39<br>21 5 0 2 11 27<br>25 9 1 3 7 23<br>29 13 4 8 12 19<br>33 16 20 24 28 32 | 0 20 5 25 3 23 9 29<br>30 10 35 15 33 13 39 19<br>8 28 4 24 6 26<br>38 18 37 14 36 16<br>2 22 7 27 1 21<br>31 12 37 17 31 11 |
| ⋮ | (OMITTED) | (OMITTED) |
| 40 | 34 30 26 22 18 35 36 37<br>17 14 10 6 15 31 38 39<br>21 5 0 2 11 27<br>25 9 1 3 7 23<br>29 13 4 8 12 19<br>33 16 20 24 28 32 | 0 20 5 25 3 23 9 29<br>30 10 35 15 33 13 39 19<br>8 28 4 24 6 26<br>38 18 37 14 36 16<br>2 22 7 27 1 21<br>31 12 37 17 31 11 |

FIG.19

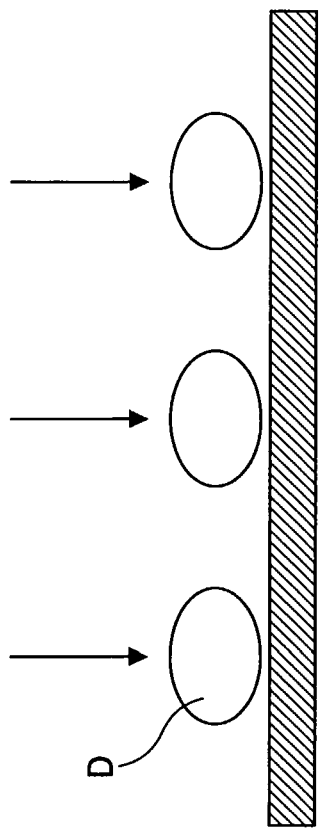
FIG.20A SILK GLOSS PAPER
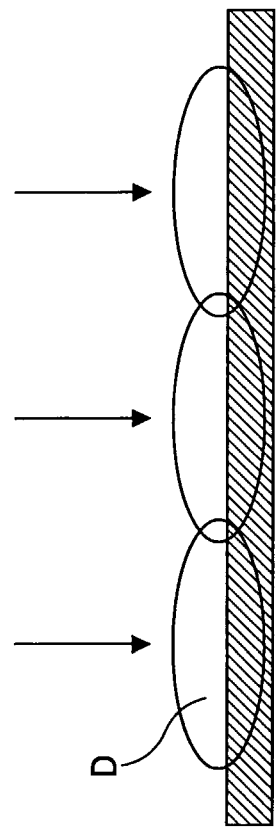
FIG.20B PLAIN PAPER
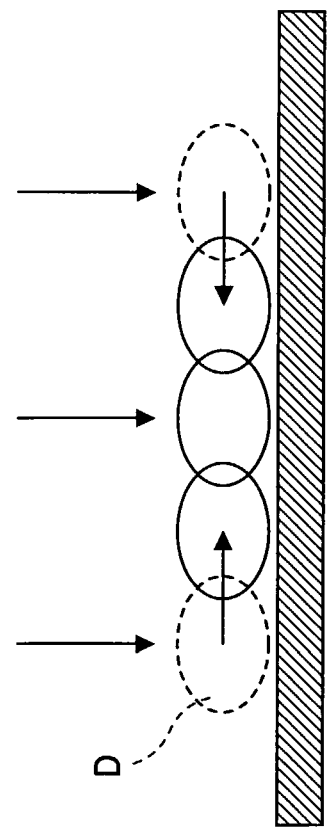
FIG.20C GLOSS PAPER

DITHER MATRIX, IMAGE PROCESSING METHOD, STORAGE MEDIUM, IMAGE PROCESSING APPARATUS, IMAGE FORMING APPARATUS, AND IMAGE FORMING SYSTEM

TECHNICAL FIELD

The present invention generally relates to a dither matrix, an image processing method, a storage medium, an image processing apparatus, an image forming apparatus, and an image forming system.

BACKGROUND ART

An ink jet recording apparatus is an image forming apparatus that uses one or more liquid drop jet heads as recording heads. An ink jet recording apparatus is used, for example, as a printer, a facsimile, a copier, or a multifunction copier having functions of a printer, facsimile, and copier. An ink jet recording apparatus jets drops of inks or recording liquids from its recording heads onto paper (not limited to a sheet of paper but also refers to any medium, such as an OHP sheet, on which an image can be formed using ink drops or liquid drops, and may also be called a recording medium, recording paper, recording sheet, recording material, medium, or the like), and thereby forms (records or prints) an image on the paper.

Such an ink jet recording apparatus is able to form, for example, four types (or halftone levels) of dots: no dot, a small-size dot, a medium-size dot, and a large-size dot. However, these four types of dots are not enough to reproduce a large number of gradation levels. Therefore, to reproduce a large number of gradation levels, dither methods are used. In a dither method, halftones are reproduced by using both density modulation (intensity modulation) and area coverage modulation.

In a binary dither method, the density value of a pixel at a coordinate point is compared with a corresponding threshold value in a dither matrix and binarized into 1 (printed or illuminated) or 0 (not printed or not illuminated) based on the result of the comparison. This method enables obtaining binarized data for area coverage modulation by just comparing the density values of pixels in an image data with threshold values in a dither matrix and therefore enables high-speed processing.

Also, there are dither methods that use three or more values. For example, when forming an image with an ink jet recording apparatus that can form dots in three sizes, three dither matrices are used and pixels are classified into 0 (no dot), 1 (small-size dot), 2 (medium-size dot), or 3 (large-size dot).

There are many types of dither matrices. For example, Bayer dither matrix, random dither matrix, and blue-noise dither matrix are well-known. These dither matrices are designed so that dots are not concentrated in an area but uniformly distributed in area coverage modulation, and therefore are called dispersion types. Also, there are dither matrices called concentration types that are designed so that dots are concentrated around a certain point. For example, there is a concentration type dither matrix in which submatrices are arranged to form a screen angle.

Patterns formed by concentrated dots are highly visible when printed and hide unevenness in image density caused by low paper quality or low printing accuracy. Therefore, concentration type dither matrices are widely used especially in commercial printing.

Patent document 1 discloses a method of producing a mask or a dither matrix made of threshold values with which pixels in multi-level image data are compared to convert the multi-level image data into a halftone image. This method includes steps of a) determining a halftone dot pattern for each of predetermined halftone levels and b) creating the mask with the halftone dot patterns obtained in step a). In step a), halftone dot patterns are determined independently for each halftone level.

Patent document 2 discloses a method of preparing a halftone processing mask used in a tone reproduction method in which, when converting a multi-tone image dot by dot into binarized or multi-level image data using a dither matrix, parts of the multi-tone image with a certain density are converted to form a line based pattern having a predetermined direction and other parts are converted to have high-pass filter characteristics. The halftone processing mask is designed so that the line based pattern includes dots that always synchronize with a recording sequence matrix of dots formed by a combination of multipassing and interlacing of a serial head.

[Patent document 1] Japanese Patent Application Publication No. 2003-046777

[Patent document 2] Japanese Patent Application Publication No. 2005-001221

Although concentration type dither matrices have advantages as described above, they have disadvantages too. For example, when forming an image using an ink jet recording apparatus, concentration of dots or concentration of ink in an area may cause bleeding or undermine fixation of the ink.

It is possible to design a concentration type dither matrix so that dots are not concentrated excessively. However, in highlight parts of an image, since only a small amount of ink is used, it is preferable to concentrate dots. On the other hand, in shadow parts, concentrated dots may cause problems. These two conflicting facts are making it difficult to design an appropriate dither matrix.

Also, on a coated glossy paper, ink does not spread smoothly and therefore it is comparatively difficult to evenly cover the surface with ink. On such a coated glossy paper, it is preferable to emphasize patterns using a concentration type dither matrix in parts with a low halftone level. However, using a concentration type dither matrix in parts with a middle or high halftone level may cause some dots to be left blank and reduce the image quality.

To reproduce smooth gradation using a dither matrix, the number of gradation levels of the dither matrix must be larger than that of input pixels. Generally, there are two methods to increase the number of gradation levels. A first method is to increase the size of a submatrix. A second method is to use multiple submatrices as a unit and thereby to increase the total number of dots. In the first method, when the number of gradation levels increases, the screen frequency decreases. Therefore, the first method is not suitable to produce a high-resolution image with a large number of gradation levels. The second method makes it possible to increase the number of gradation levels without decreasing the screen frequency. Since the dot areas (the numbers of dots generated) of submatrices are not always the same, if the ratio between submatrices with a large number of dots and submatrices with a small number of dots is unbalanced, the resulting pattern may look like a texture.

In a method where color planes of a color image, such as a CMYK image or an RGB image, are processed using a same dither mask, secondary or higher colors are formed by overlapping halftone patterns of different colors. When an image is formed using such a method on a paper on which ink does not spread smoothly, irregular white spots may be left in the image and, as a result, the image quality is reduced. Also, when an image is formed with a printing apparatus in which a dominant color is determined by the order of overlapping inks, such a method may cause hue distortion.

BRIEF SUMMARY

In an aspect of this disclosure, there are provided a dither matrix, an image processing method that uses the dither matrix, a storage medium having a program stored therein for causing a computer to perform the image processing method, an image processing apparatus for performing the image processing method, an image forming apparatus for performing the image processing method, and an image forming system including the image processing apparatus and the image forming apparatus.

In another aspect, there is provided a dither matrix used in halftone processing for converting input image data having M input halftone levels into output image data having N (M>N>2) output halftone levels. In the halftone processing, a concentration type dither matrix is used as the dither matrix when an input halftone level is within a range of input halftone levels corresponding to an output halftone level that is lower than a predetermined threshold level T (N>T>1), and a dispersion type dither matrix is used as the dither matrix when the input halftone level is within a range of input halftone levels corresponding to an output halftone level that is equal to or higher than the predetermined threshold level T.

BRIEF DESCRIPTION OF THE DRAWINGS

FIG. 12 is a drawing showing exemplary threshold values in the exemplary dither matrices shown in FIG. 11;

FIG. 13 is a drawing used to describe one of the exemplary dither matrices shown in FIG. 12;

FIG. 14 is a drawing used to describe an exemplary concentration type dither matrix and an exemplary dispersion type dither matrix;

FIG. 19 is a drawing illustrating a base dither matrix and a dither matrix having an opposite dot arrangement order;

FIGS. 20A through 20C are drawings illustrating the behavior of ink drops on papers of different types;

BEST MODE FOR CARRYING OUT THE INVENTION

Preferred embodiments of the present invention are described below with reference to the accompanying drawings.

Figure 1:
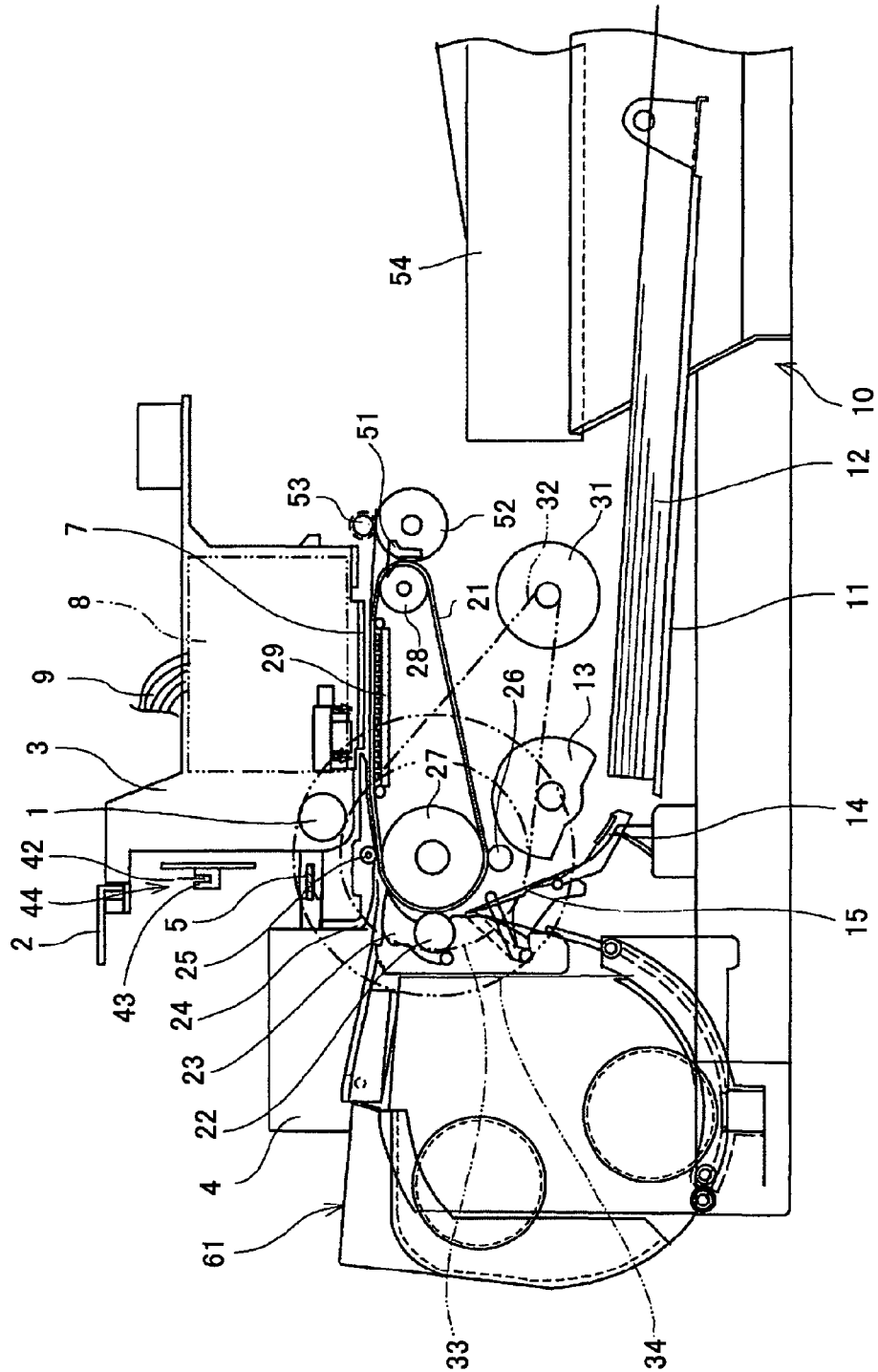
FIG. 1 is a side elevational view of mechanical parts of an exemplary image forming apparatus for outputting image data generated by an image processing method according to an embodiment of the present invention.
Figure 2:
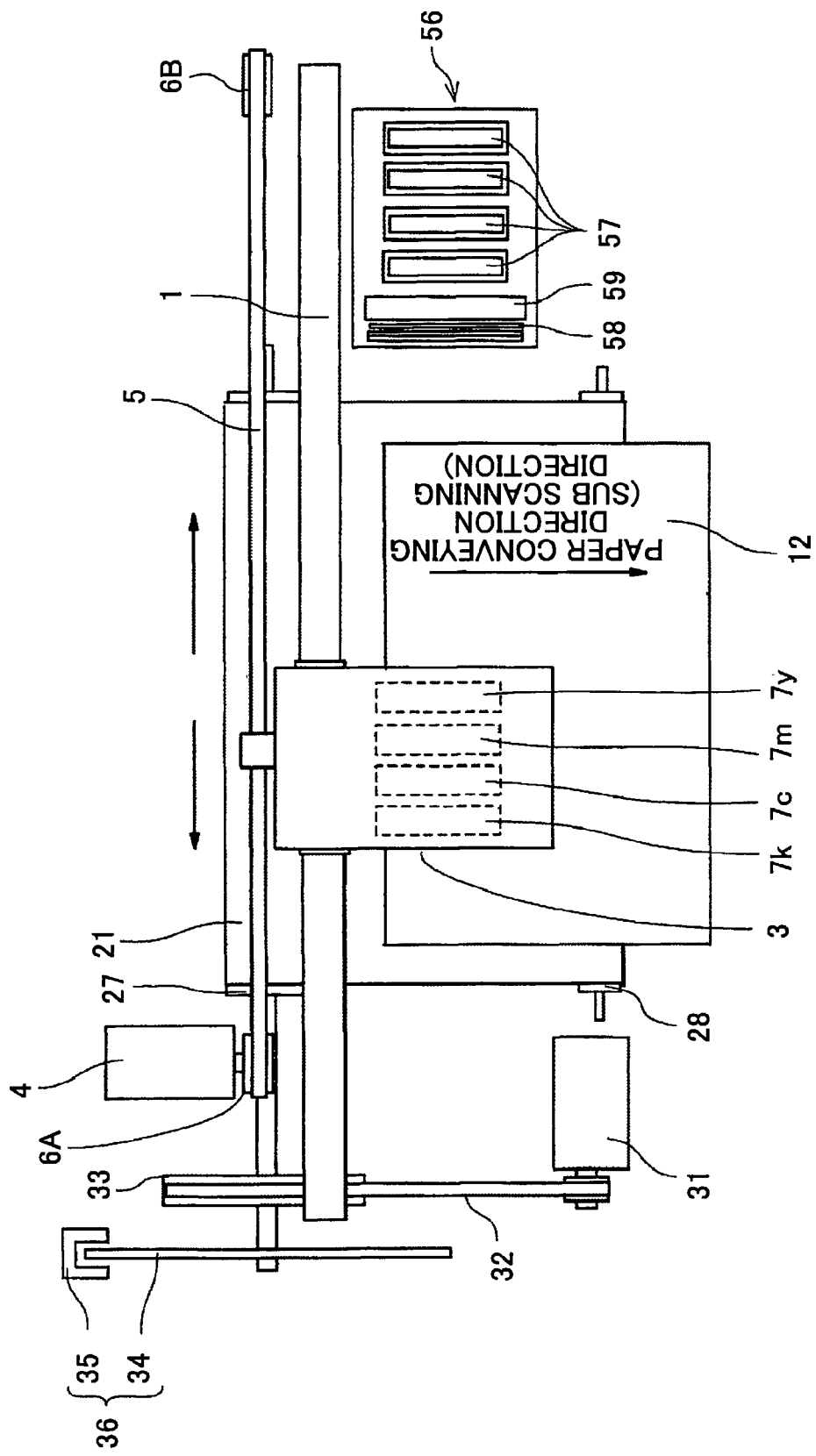
FIG. 2 is a plan view of the mechanical parts shown in FIG. 1.

An exemplary image forming apparatus for outputting image data generated by using an exemplary image processing method according to an embodiment of the present invention is described below with reference to FIG. 1 and FIG. 2. FIG. 1 is a side elevational view of mechanical parts of the exemplary image forming apparatus. FIG. 2 is a plan view of the mechanical parts shown in FIG. 1.

In the exemplary image forming apparatus, a carriage 3 is supported by a guiding unit, which includes a guide rod 1 and a guide rail 2 laid between right and left sideboards (not shown), so as to be able to slide in the directions of the arrows (main-scanning directions) shown in FIG. 2. The carriage 3 is moved in the main-scanning directions by a main scanning motor 4 via a timing belt 5 stretched between a drive pulley 6A and a driven pulley 6B shown in FIG. 2.

On the carriage 3, for example, four recording heads 7y, 7c, 7m, and 7k (collectively called recording heads 7 for brevity and/or when color distinction is not made) made up of liquid drop jet heads for jetting ink drops of yellow (Y), cyan (C), magenta (M), and black (K) are mounted. The recording heads 7 are arranged so that an array of ink jet nozzles of the recording heads 7 forms a right angle with the main scanning directions, and ink drops are jetted downward.

Each of the liquid drop jet heads forming the recording heads 7 includes a pressure-generating unit for generating pressure to jet liquid drops. For such a pressure-generating unit, a piezoelectric actuator such as a piezoelectric element, a thermal actuator using liquid film boiling caused by an electrothermal converting element such as a heat element, a shape memory alloy actuator using metal phase changes caused by temperature changes, or an electrostatic actuator using static electricity may be used. Each liquid drop jet head may not necessarily be dedicated to one color. The recording heads 7 may be composed of one or more liquid drop jet heads each having arrays of nozzles for jetting different color inks.

The carriage 3 also includes sub-tanks 8 for supplying color inks to the recording heads 7. The sub-tanks 8 are supplied with color inks from main-tanks (ink cartridges) (not shown) through ink supply tubes 9.

The exemplary image forming apparatus also includes a paper feeding unit for feeding paper sheets 12 stacked on a paper stacking plate (pressing plate) 11 of a paper feed tray 10. The paper feeding unit includes a crescent roller (paper feed roller) 13 for separating the paper sheets 12 and feeding them one by one from the paper stacking plate 11, and a separating pad 14 facing the paper feed roller 13 and made of a material with a high friction coefficient. The separating pad 14 is biased toward the paper feed roller 13.

The exemplary image forming apparatus also includes a conveying unit for conveying the paper sheet 12 fed from the paper feeding unit to a position under the recording heads 7. The conveying unit includes a guide 15 that guides the paper sheet 12 fed from the paper feeding unit, a conveyor belt 21 that electrostatically attracts and thereby conveys the paper sheet 12, a counter roller 22 that presses the paper sheet 12 against the conveyor belt 21 and thereby conveys the paper sheet 12, a conveying guide 23 that changes approximately 90 degrees the direction of the paper sheet 12 being fed approximately vertically upward so that the paper sheet 12 is laid on the conveyor belt 21, a pressing part 24, and a pressing roller 25 biased by the pressing part 24 toward the conveyor belt 21. The exemplary image forming apparatus also includes a charging roller 26 for charging the surface of the conveyor belt 21.

The conveyor belt 21 is an endless belt and is stretched between a conveying roller 27 and a tension roller 28. The conveyor belt 21 is turned in the paper conveying direction (sub scanning direction) shown in FIG. 2 by the conveying roller 27 rotated by a sub scanning motor 31 via a timing belt 32 and a timing roller 33. A guide 29 is provided under the conveyor belt 21 in a position corresponding to the image forming area of the recording heads 7. The charging roller 26 is positioned so as to contact the surface of the conveyor belt 21 and to rotate according to the rotation of the conveyor belt 21.

As shown in FIG. 2, the exemplary image forming apparatus also includes a rotary encoder 36. The rotary encoder 36 includes a slit wheel 34 attached to the axis of the conveying roller 27 and an encoder sensor 35 for detecting the slit on the slit wheel 34.

The exemplary image forming apparatus further includes a paper ejecting unit for ejecting the paper sheet 12 on which an image has been recorded by the recording heads 7. The paper ejecting unit includes a sheet separating claw 51 for separating the paper sheet 12 from the conveyor belt 21, a paper ejecting roller 52, a paper ejecting roller 53, and a paper catch tray 54 for receiving the ejected paper sheet 12.

A duplex unit 55 is detachably attached to the back of the exemplary image forming apparatus. The duplex unit 61 takes in the paper sheet 12 that is conveyed backward by the conveyor belt 21 turning in the opposite direction, reverses the paper sheet 12, and feeds the paper sheet 12 again into the space between the counter roller 22 and the conveyor belt 21.

Also, as shown in FIG. 2, a recording head maintenance/cleaning mechanism 56 is provided in a non-image-forming area to the right of the carriage 33. The recording head maintenance/cleaning mechanism 56 maintains and cleans the nozzles of the recording heads 7.

The recording head maintenance/cleaning mechanism 56 includes caps 57 for covering the nozzle surfaces of the recording heads 7, a wiper blade 58 for wiping the nozzle surfaces, and a waste-ink receiver 59 for receiving ink drops used for purging dried ink from the nozzles.

In the exemplary image forming apparatus configured as described above, the paper sheets 12 are separated and fed one by one from the paper feed tray 10, the separated paper sheet 12 is fed approximately vertically upward and guided by the guide 15 into the space between the conveyor belt 21 and the counter roller 22 so as to be conveyed further, the leading edge of the paper sheet 12 is guided by the conveying guide 23 and pressed by the pressing roller 25 onto the conveyor belt 21, and then the direction of the paper sheet 12 is changed approximately 90 degrees.

At this stage, an AC bias applying unit of a control unit described later applies alternating voltages to the charging roller 26 by alternately outputting positive and negative voltages. As a result, positively and negatively charged strips with a constant width are formed alternately in the paper conveying direction (sub scanning direction) on the surface of the conveyor belt 21. When the paper sheet 12 is conveyed onto the charged conveyor belt 21, the paper sheet 12 is electrostatically attracted to the conveyor belt 21 and thereby conveyed in the sub scanning direction as the conveyor belt 21 turns.

The recording heads 7 are driven while moving the carriage 3 in the main scanning directions (outbound and inbound directions shown by the arrows in FIG. 2) according to an image signal to jet ink drops, and record a line of image on the paper sheet 12 that is paused at a position. Then, the paper sheet 12 is conveyed further a specified distance, and the next line is recorded. When a recording completion signal or a signal indicating that the bottom edge of the paper sheet 12 has reached the image forming area is received, the exemplary image forming apparatus terminates the image forming process and ejects the paper sheet 12 into the paper catch tray 54.

In duplex printing, after an image is formed on the upper side (a side of the paper sheet 12 on which an image is formed first) of the paper sheet 12, the paper sheet 12 is fed into the duplex unit 61 by turning the conveyor belt 21 in the reverse direction, the paper sheet 12 is reversed (so that the underside of the paper sheet 12 faces upward) and fed again into the space between the counter roller 22 and the conveyor belt 21, the paper sheet 12 is conveyed by the conveyor belt 21 at controlled timings as described earlier, an image is formed on the underside, and then the paper sheet 12 is ejected onto the paper catch tray 54.

When the exemplary image forming apparatus is idle, the carriage 3 is moved into a position above the recording head maintenance/cleaning mechanism 56. In the position, the nozzle surfaces of the recording heads 7 are covered by the caps 57 to retain moisture of the nozzles and thereby to prevent nozzle clogging caused by dried ink. With the recording heads 7 capped by the caps 57, the nozzles are suctioned to remove dried ink or air bubbles. The ink adhered to the nozzle surfaces of the recording heads 7 during this recording head maintenance is wiped off by the wiper blade 58. Also, before or during an image forming process, ink is jetted in order to clean the nozzles. With the above measures, the ink jet performance of the recording heads 7 is maintained.

Figure 3:
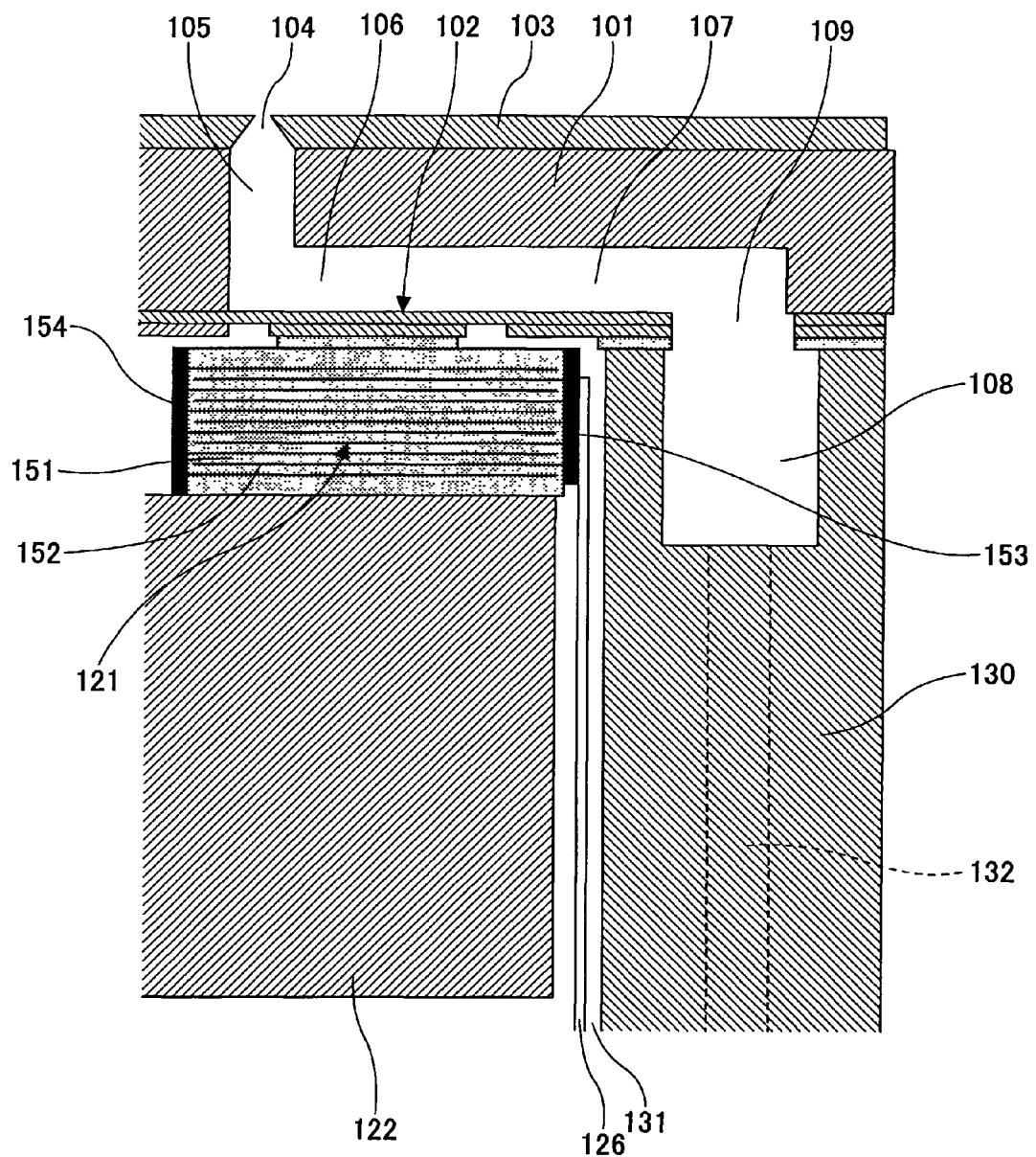
FIG. 3 is a cross-sectional view of an exemplary recording head of the exemplary image forming apparatus taken along the length of a liquid chamber.
Figure 4:
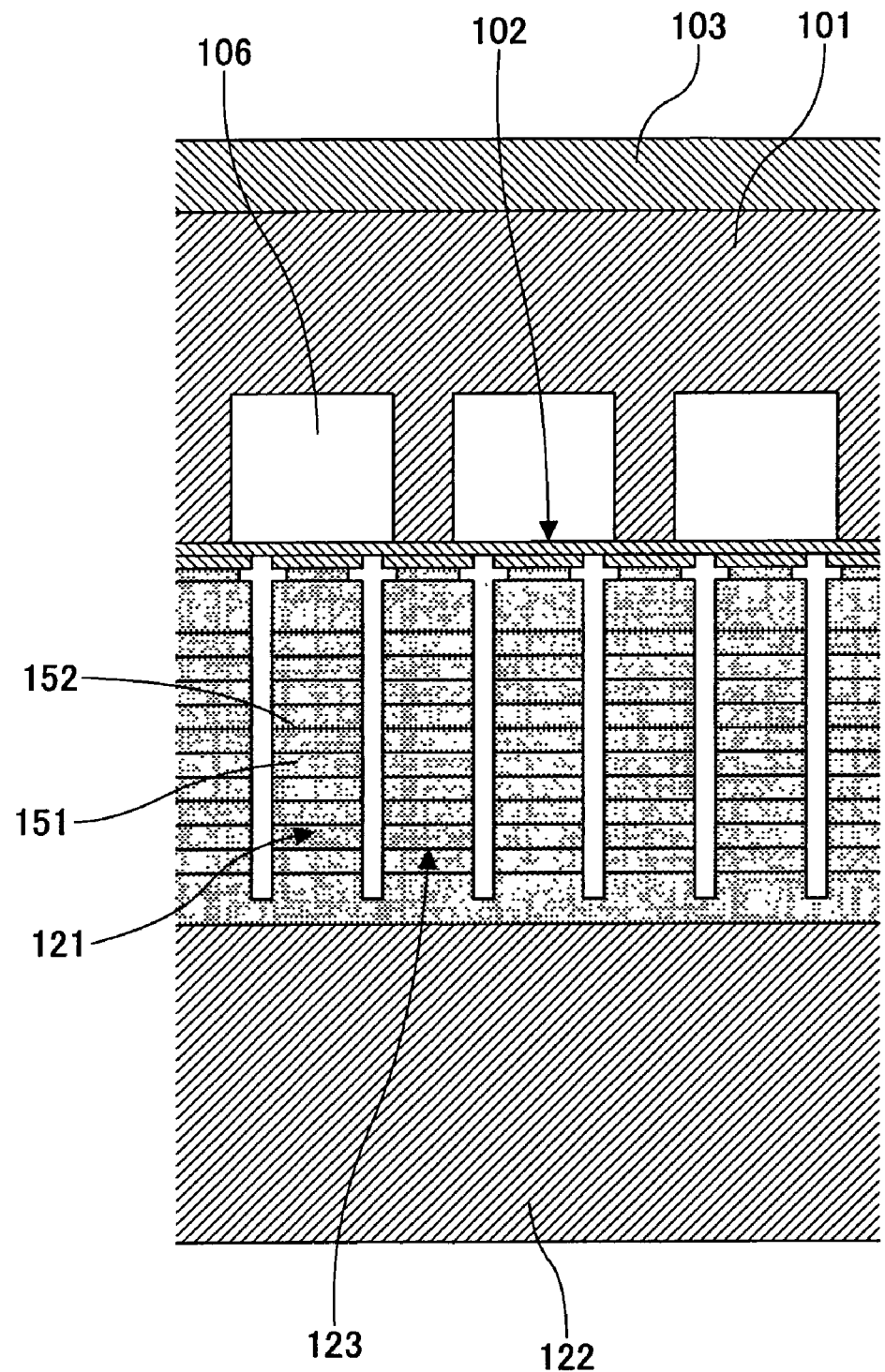
FIG. 4 is a cross-sectional view of the exemplary recording head taken along the width of the liquid chamber.

An exemplary liquid drop jet head of the recording heads 7 is described below with reference to FIGS. 3 and 4. FIG. 3 is a cross-sectional view of the exemplary liquid drop jet head taken along the length of its liquid chamber. FIG. 4 is a cross-sectional view of the exemplary recording head taken along the width of its liquid chamber (along the nozzle array).

The exemplary liquid drop jet head includes a channel plate 101 formed, for example, by anisotropically etching a single-crystal silicon substrate; a vibrating plate 102 formed, for example, by electroforming nickel and bonded to the underside of the channel plate 101; and a nozzle plate 103 bonded to the upper side of the channel plate. The channel plate 101, the vibrating plate 102, and the nozzle plate 103 are arranged so as to form a nozzle 104 for jetting liquid drops (ink drops), a nozzle connecting channel 105 leading to the nozzle 104, a liquid chamber 106 used as a pressure-generating chamber, a fluid resistance part (supply channel) 107 for supplying ink to the liquid chamber 106, and an ink supply opening 109 leading to a common liquid chamber 108.

Figure 6:
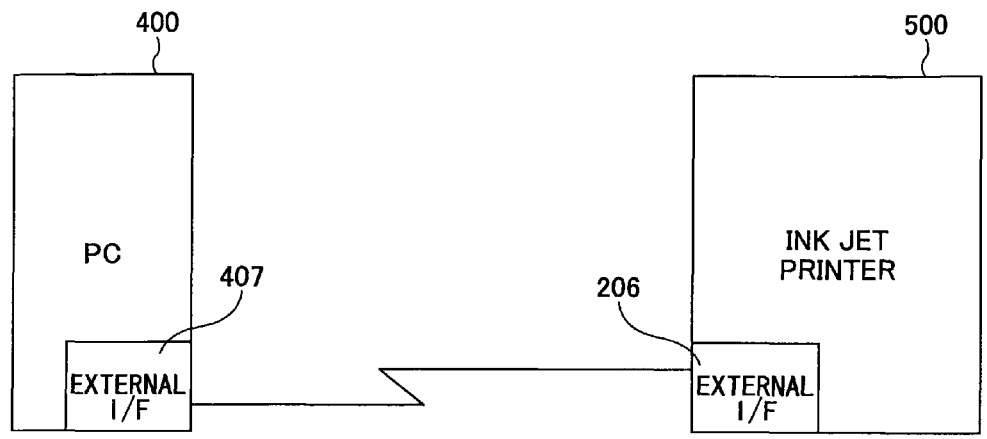
FIG. 6 is a block diagram illustrating an exemplary image forming system according to an embodiment of the present invention.

The exemplary liquid drop jet head also includes two arrays of stacked piezoelectric elements 121 (only one array is shown in FIG. 6) that are electromechanical conversion elements and used as a pressure-generating unit (actuator unit) to pressurize ink in the liquid chamber 106 by deforming the vibrating plate 102; and a base plate 122 on which the piezoelectric elements 121 are fixed. Between the piezoelectric elements 121, supports 123 are provided. The supports 123 are formed at the same time when a piezoelectric material is processed to form the piezoelectric elements 121. Since no driving voltage is applied to the supports 123, they just function as supporting parts.

A FPC cable 126 having a driving circuit (driving IC) (not shown) is connected to the piezoelectric elements 121.

The peripheral part of the vibrating plate 102 is bonded to a frame part 130. The frame part 130 forms a through hole 131 for housing an actuator unit including the piezoelectric elements 121 and the base plates 122, a recess used as the common liquid chamber 108, and an ink supply hole 132 for supplying ink from the outside to the common liquid chamber 108. The frame part 130 is made of, for example, a thermosetting resin such as an epoxy resin or polyphenylene sulfide and formed by injection molding.

The recess and hole in the channel plate 101 used as the nozzle connecting channel 105 and the liquid chamber 106 are formed by anisotropically etching a single-crystal silicon substrate with a crystal orientation (110) using an alkaline etching liquid such as a potassium hydroxide solution (KOH). The material for the channel plate 101 is not limited to a single-crystal silicon substrate, but a stainless steel substrate, a photosensitive resin, or the like may also be used.

The vibrating plate 102 is formed, for example, by electroforming a nickel plate. The material for the vibrating plate 102 is not limited to a nickel plate, but other types of metal plates or a laminated plate made of a metal plate and a resin plate may also be used. The piezoelectric elements 121 and the supports 123 are bonded to the vibrating plate 102 with an adhesive, and the vibrating plate 102 is bonded to the frame part 130 with an adhesive.

The nozzle plate 103 forms the nozzle 104 with a diameter of 10-30 μm for each of the liquid chambers 106. The nozzle plate 103 is bonded to the channel plate 101 with an adhesive. The nozzle plate 103 is made by forming layers on the surface of a nozzle forming material made of a metal. The top-most layer of the nozzle plate 103 is made of a water repellent material.

The nozzle plate 103 as described above has excellent water repellency (or ink repellency) and therefore can form ink drops of a normal shape even when an ink with a low surface tension is used. More specifically, a water repellent layer reduces the wettability of a nozzle plate and makes it possible for an ink with a low surface tension to normally form a meniscus. A normally formed meniscus prevents the ink from being drawn to one side, prevents bending of an ink stream, and thereby makes it possible to accurately form a dot.

When an image is formed on a recording medium with a low ink-absorption rate, the positional accuracy of dots greatly affects the quality of the image. In other words, on a recording medium with a low ink-absorption rate, ink drops do not spread smoothly. Therefore, if the positional accuracy of dots is low, some parts in an image forming area on the recording medium may not be filled by the ink drops and, as a result, may be left blank. The parts left blank cause irregularity or decrease of the image density, and thereby degrade the image quality.

A nozzle plate as described above makes it possible to form dots with high positional accuracy even with an ink having a low surface tension; prevents irregularity or decrease of image density; and thereby makes it possible to form a high-quality image even on a recording medium with a low ink-absorption rate.

The piezoelectric element 121 is a stacked piezoelectric element (PZT in this embodiment) formed by alternately stacking a piezoelectric material 151 and an internal electrode 152. The ends of the internal electrodes 121 are exposed alternately on one or the other side of the piezoelectric element 121 and are connected to an individual electrode 153 and a common electrode 154. In this embodiment, the ink in the liquid chamber 106 is pressurized by the displacement of the piezoelectric element 121 in the d33 direction. However, the exemplary liquid drop jet head may be configured to pressurize the ink in the liquid chamber 106 by the displacement of the piezoelectric element 121 in the d31 direction. Also, the exemplary liquid drop jet head may be configured so that one array of the piezoelectric elements 121 is provided on one base plate 122.

In the exemplary liquid drop jet head configured as described above, when the voltage applied to the piezoelectric element 121 is decreased below a reference potential, the piezoelectric element 121 contracts and causes the vibrating plate 102 to move upward, the volume of the liquid chamber 106 increases, and, as a result, ink flows into the liquid chamber 106. When the voltage applied to the piezoelectric element 121 is increased, the piezoelectric element 121 expands in the direction in which the layers of the piezoelectric element 121 are stacked and causes the vibrating plate 102 to deform toward the nozzle 104, the volume of the liquid chamber 106 decreases, the ink in the liquid chamber 106 is pressurized, and, as a result, ink drops are jetted from the nozzle 104.

When the voltage applied to the piezoelectric element 121 is returned to the reference potential, the vibrating plate returns to its initial position, the liquid chamber 106 expands and thereby generates a negative pressure, and, as a result, ink flows into the liquid chamber 106 from the common liquid chamber 108. After the vibration of the meniscus surface of the nozzle 104 decreases and the nozzle 104 stabilizes, the next liquid drop jetting process is started.

The method of driving the exemplary liquid drop jet head is not limited to the method described above.

Figure 5:
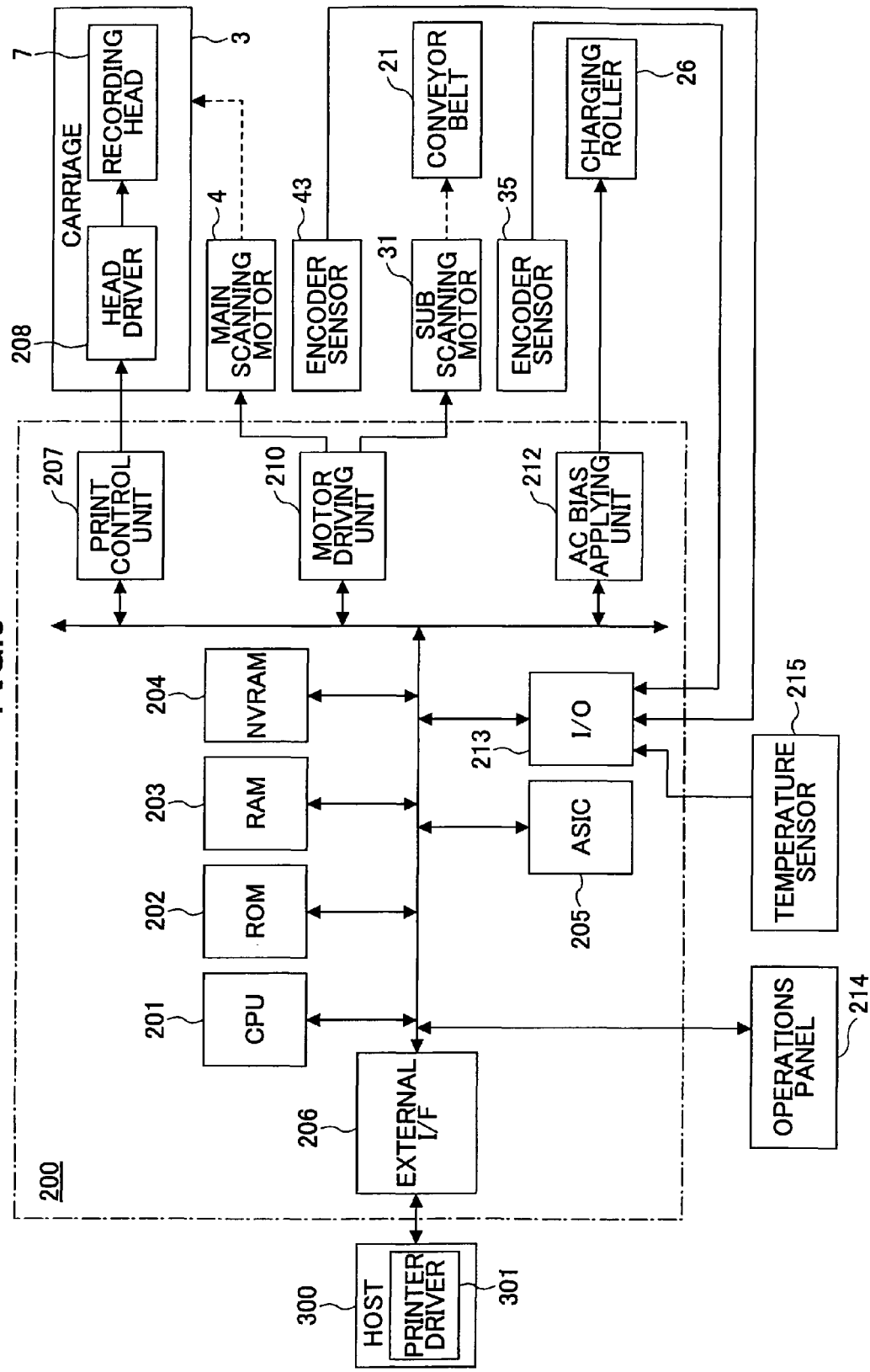
FIG. 5 is a block diagram illustrating an exemplary control unit of the exemplary image forming apparatus.

An exemplary control unit of the exemplary image forming apparatus is outlined below with reference to the block diagram shown in FIG. 5.

The control unit 200 includes a CPU 211 for controlling the entire operations of the exemplary image forming apparatus, a ROM 202 for storing programs to be executed by the CPU 211 and other fixed data, a RAM 203 for temporarily storing image data, a rewritable non-volatile memory 204 that retains data even when the power is off, and an ASIC 205 that performs, for example, signal processing and a sort operation on image data and handles input/output signals for controlling the exemplary image forming apparatus.

The control unit 200 also includes an external I/F 206 for sending/receiving data and signals to/from a host 300, a print control unit 207 including a data transfer unit for transferring data to control the recording heads 7 and a drive waveform generating unit for generating drive waveforms, a head driver (driver IC) 208 for driving the recording heads 7, a motor driving unit 210 for driving the main scanning motor 4 and the sub scanning motor 31, an AC bias applying unit 212 for applying an AC bias to the charging roller 26, and an I/O 213 for receiving detection signals from encoder sensors 35 and 43 and a temperature sensor 215. An operations panel 214 for inputting and displaying information is connected to the control unit 200.

The external I/F 206 of the control unit 200 receives print data via a cable or a network from the host 300. The host 300 may be an information processing apparatus such as a personal computer, an image reading apparatus such as an image scanner, an imaging apparatus such as a digital camera, or the like.

The CPU 201 of the control unit 200 reads out and analyzes the print data in a receive buffer of the external I/F 206, causes the ASIC 205 to perform image processing and a sort operation on the print data, and transfers image data in the print data via the print control unit 107 to the head driver 208. Halftone dot pattern data for printing the image are generated by a printer driver 301 of the host 300 as described later.

The print control unit 207 transfers the image data as serial data to the head driver 208. The print control unit 207 outputs a transfer clock, according to which the image data is transferred, a latch signal, and an ink drop control signal (mask signal) to the head driver 208. Also, the print control unit 207 includes a D/A converter for converting drive signal pattern data stored in the ROM 202 from digital to analog, a drive waveform generating unit including a voltage amplifier and a current amplifier, and a drive waveform selecting, unit for selecting a drive waveform to be supplied to the head driver 208. The print control unit 207 generates a drive waveform made up of one drive pulse (drive signal) or two or more drive pulses (drive signals), and outputs the drive waveform to the head driver 208.

The head driver 208 applies drive signals constituting the drive waveform supplied from the print control unit 207 selectively to the piezoelectric elements 121 according to one line (one scan by the recording heads 7) of the image data input as serial data, and thereby drives the recording heads 7. The recording heads 7 can form dots of different sizes, for example, a large-size dot, a medium-size dot, or a small-size dot, according to a drive pulse selected.

The CPU 201 calculates a drive output value (control value) for the main scanning motor 4 based on speed detection and position detection values obtained by sampling a detection pulse from the encoder sensor 43 of a linear encoder 44 and speed target and position target values obtained from a stored speed and position profile, and causes the motor driving unit 210 to drive the main scanning motor 4 using the calculated control value. Also, the CPU 201 calculates a drive output value (control value) for the sub scanning motor 31 based on speed detection and position detection values obtained by sampling a detection pulse from the encoder sensor 35 of the rotary encoder 36 and speed target and position target values obtained from a stored speed and position profile, and causes the motor driving unit 210 to drive the sub scanning motor 31 using the calculated control value.

An exemplary image forming system including an image processing apparatus according to an embodiment of the present invention and the above described exemplary image forming apparatus is described below with reference to FIG. 6. The exemplary image processing apparatus includes a program for causing a computer to perform an image forming method of an embodiment of the present invention.

In the descriptions below, an ink jet printer (ink jet recording apparatus) is used as the exemplary image forming apparatus.

The exemplary image forming system includes one or more image processing apparatuses 400 such as personal computers (PC) and an ink jet printer 500 connected to the image processing apparatuses 400 via interfaces or a network.

Figure 7:
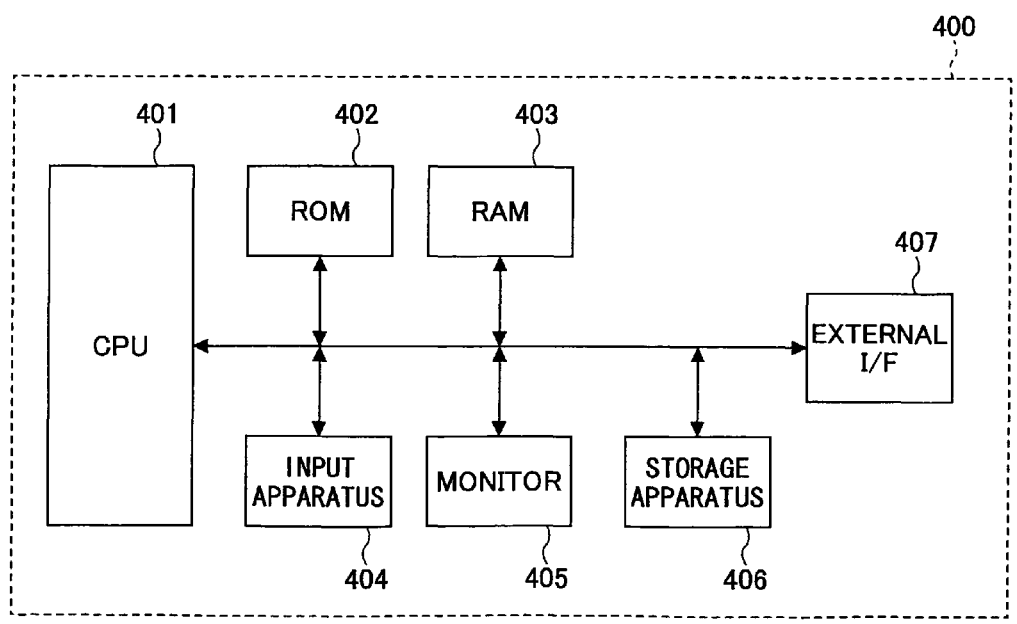
FIG. 7 is a block diagram illustrating an exemplary image processing apparatus of the exemplary image forming system.

In the image processing apparatus 400, as shown in FIG. 7, a CPU 401, and a ROM 402 and a RAM 403 used as memories are connected by a bus. Also, a storage apparatus 406 made of a magnetic storage device such as a hard disk, an input apparatus 404 including a mouse and a keyboard, a monitor 405 such as an LCD or a CRT, and a storage medium reading apparatus (not shown) for reading a storage medium such as an optical disk are connected via interfaces to the bus. Further, an external interface (I/F) 407 for communication with a network such as the Internet and an external apparatus such as an USB device is connected to the bus.

The storage apparatus 406 of the image processing apparatus 400 stores image processing programs including a program of an embodiment of the present invention. The image processing programs are read from a storage medium by the storage medium reading apparatus or downloaded from a network such as the Internet, and installed in the storage apparatus 406. The image processing programs enable the image processing apparatus 400 to perform image processing as described below. The image processing programs may be configured to run on an operating system. Also, the image processing programs may be a part of an application program.

Figure 8:
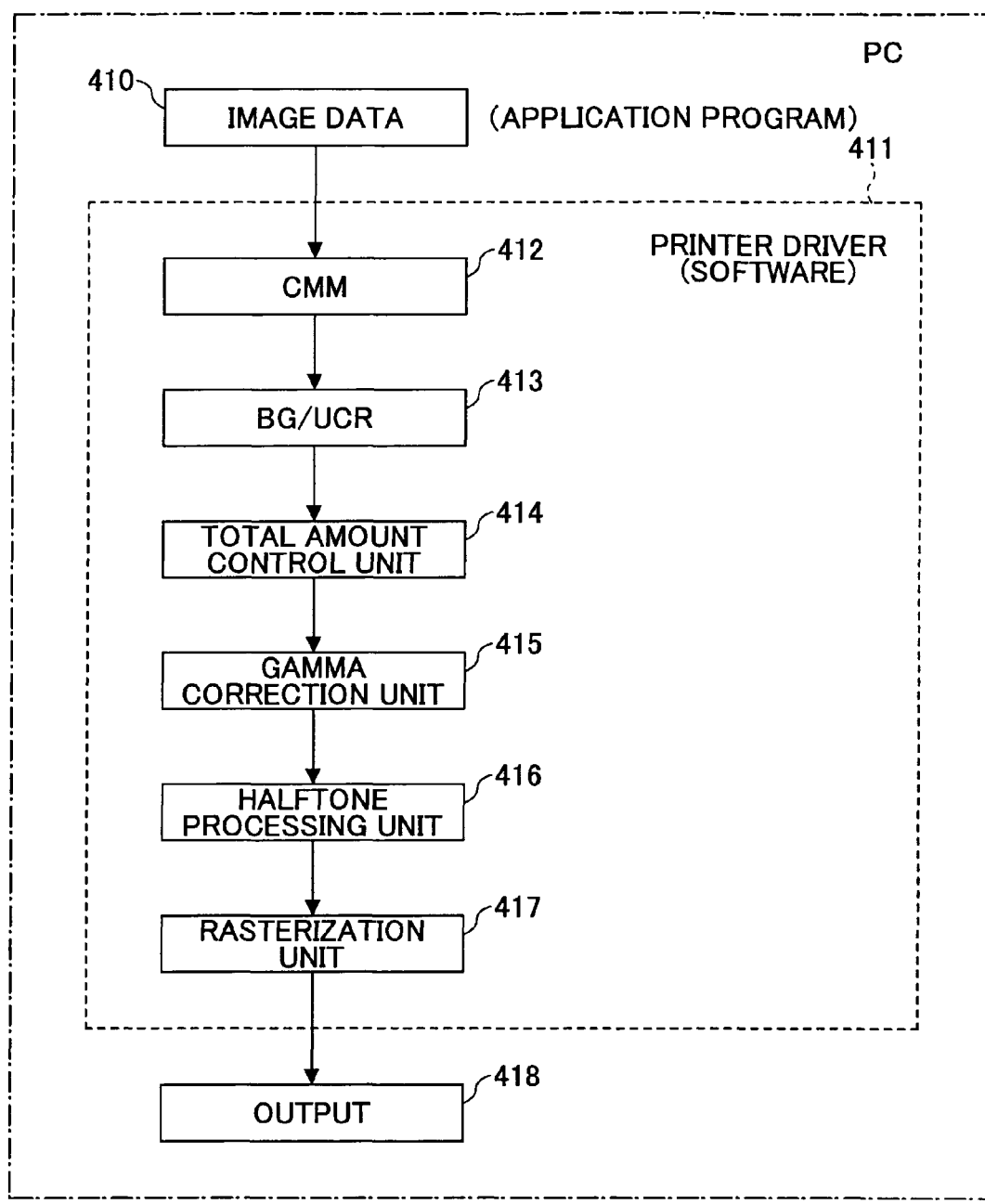
FIG. 8 is a block diagram illustrating the functional configuration of an exemplary printer driver according to an embodiment of the present invention.

FIG. 8 is a block diagram illustrating the functional configuration of an exemplary image processing program (printer driver), which runs on the image processing apparatus 400, according to an embodiment of the present invention.

A printer driver 411 of the image processing apparatus 400 includes a color management module (CMM) unit 412 that converts the color space of image data 410, which are provided, for example, from an application program, from the one for monitor display to the one for an image forming apparatus (from an RGB color system to a CMY color system), a black generation/under color removal (BG/UCR) unit 413 that calculates the amount of black and reduces the amount of cyan, magenta, and yellow, a total amount control unit 414 that corrects a CMYK signal used as a record control signal according to the total maximum amount of color inks used to form an image by an image forming apparatus, a gamma correction unit 415 that corrects input/output data to reflect the characteristics of an image forming apparatus or user preference, a zooming unit (not shown) that enlarges an image according to the resolution of an image forming apparatus, a halftone processing unit 416 including multi-valued and single-valued matrices for converting image data to halftone dot pattern data to be formed by recording heads, a rasterization unit 417 that divides the halftone dot pattern data from the halftone processing unit 416 into portions each portion corresponding to one scan and assigns dots in each portion of the halftone dot pattern data to the nozzles of the recording heads. An output 418 from the rasterization unit 417 is sent to the ink jet printer 500.

Figure 9:
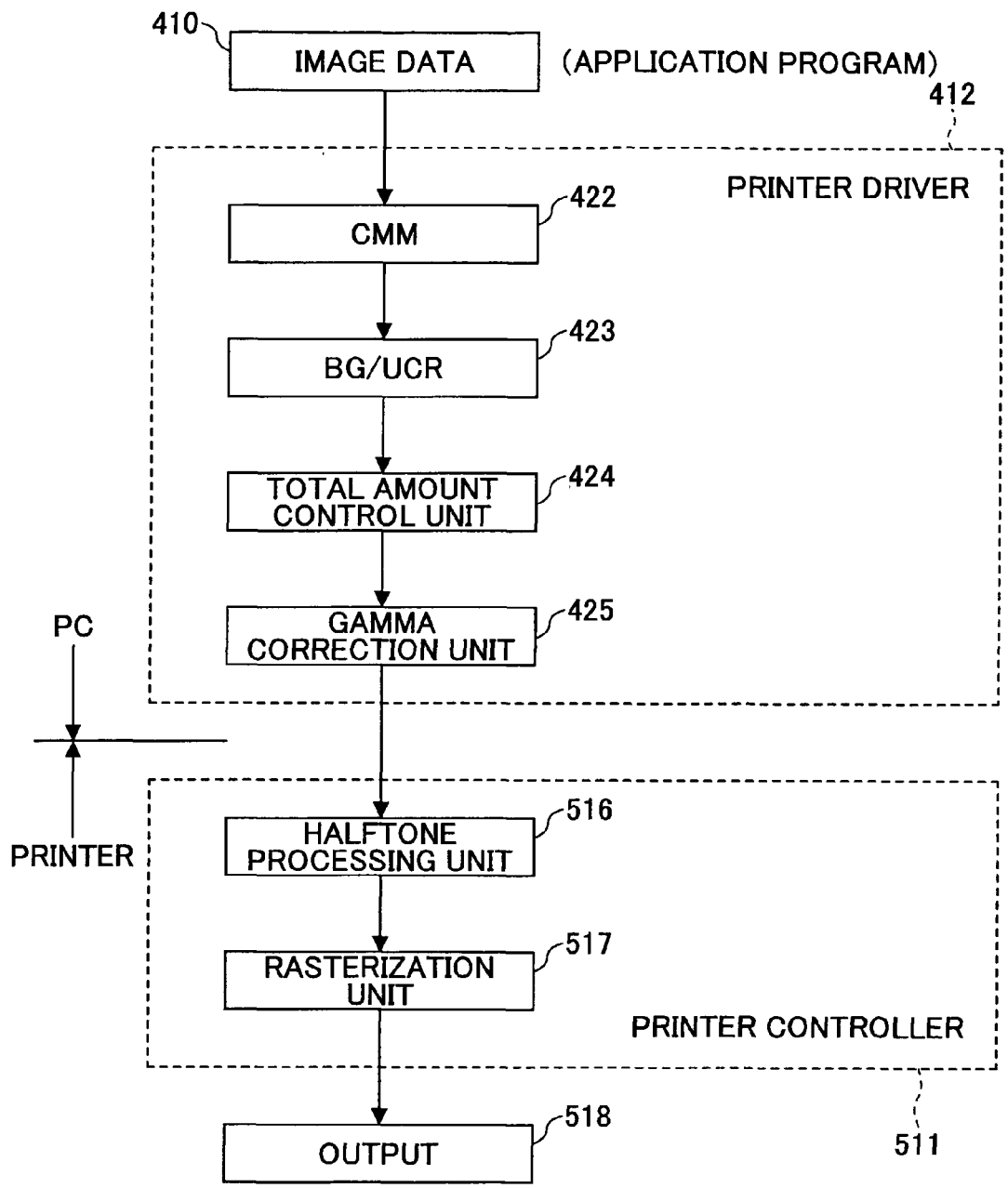
FIG. 9 is a block diagram illustrating another functional configuration of the exemplary printer driver according to an embodiment of the present invention.

A part of the above image processing may be performed on the ink jet printer 500. FIG. 9 is a block diagram illustrating the functional configuration of another exemplary printer driver according to an embodiment of the present invention.

In FIG. 9, a printer driver 421 of the image processing apparatus 400 includes a CMM unit 422, a BG/UCR unit 423, a total amount control unit 424, and a gamma correction unit 425 that have substantially the same functions as the units shown in FIG. 8. The printer driver 421 sends processed image data to the ink jet printer 500.

A printer controller 511 (control unit 200) of the ink jet printer 500 includes a zooming unit (not shown) that enlarges an image according to the resolution of an image forming apparatus; a halftone processing unit 516 including multi-valued and single-valued matrices (dither masks) for converting image data to halftone dot pattern data to be formed by recording heads; and a rasterization unit 517 that divides the halftone dot pattern data from the halftone processing unit 516 into portions each portion corresponding to one scan, and assigns dots in each portion of the halftone dot pattern data to the nozzles of the recording heads. An output 518 from the rasterization unit 517 is sent to the print control unit 207.

In an image processing method according to an embodiment of the present invention, both the printer driver 411 shown in FIG. 8 and a combination of the printer driver 421 and the printer controller 511 shown in FIG. 9 may work well. In the descriptions below, it is assumed that the ink jet printer 500 does not include functions to generate halftone dot pattern data from print data. In other words, print data from, for example, an application program being executed on the image processing apparatus 400 are converted into multi-valued halftone dot pattern data (print image data) that can be printed on the ink jet printer 500 and rasterized by the printer driver 411 of the image processing apparatus 400. The rasterized halftone dot pattern data are sent to the ink jet printer 500 and printed.

In the image processing apparatus 400, image or character print data (for example, data describing the positions, thicknesses, and shapes of lines to be recorded; or data describing fonts, sizes, and positions of characters to be recorded) from an application program or an operating system are temporarily stored in a drawing data memory. The print data are written in a page description language.

The print data stored in the drawing data memory is analyzed by a rasterizer. When the print data are to print lines, it is converted into halftone dot pattern data according to the positions and thicknesses of lines specified in the print data. When the print data are to print characters, it is converted into halftone dot pattern data according to the positions and thicknesses of characters specified in the print data by retrieving corresponding outline font data stored in the image processing apparatus 400. When the print data are to print an image, the image is directly converted into halftone dot pattern data.

Image processing is performed on the halftone dot pattern data (image data 410) and the processed halftone dot pattern data are stored in a raster data memory. In this step, the image processing apparatus 400 rasterizes print data into halftone dot pattern data using an orthogonal grid to determine the coordinates. As described above, image processing includes color management processing (by a CMM), gamma correction processing, halftone processing such as dithering and error diffusion, under color removal, and total amount control. The halftone dot pattern data stored in the raster data memory are sent via an interface to the ink jet printer 500.

Figure 10:
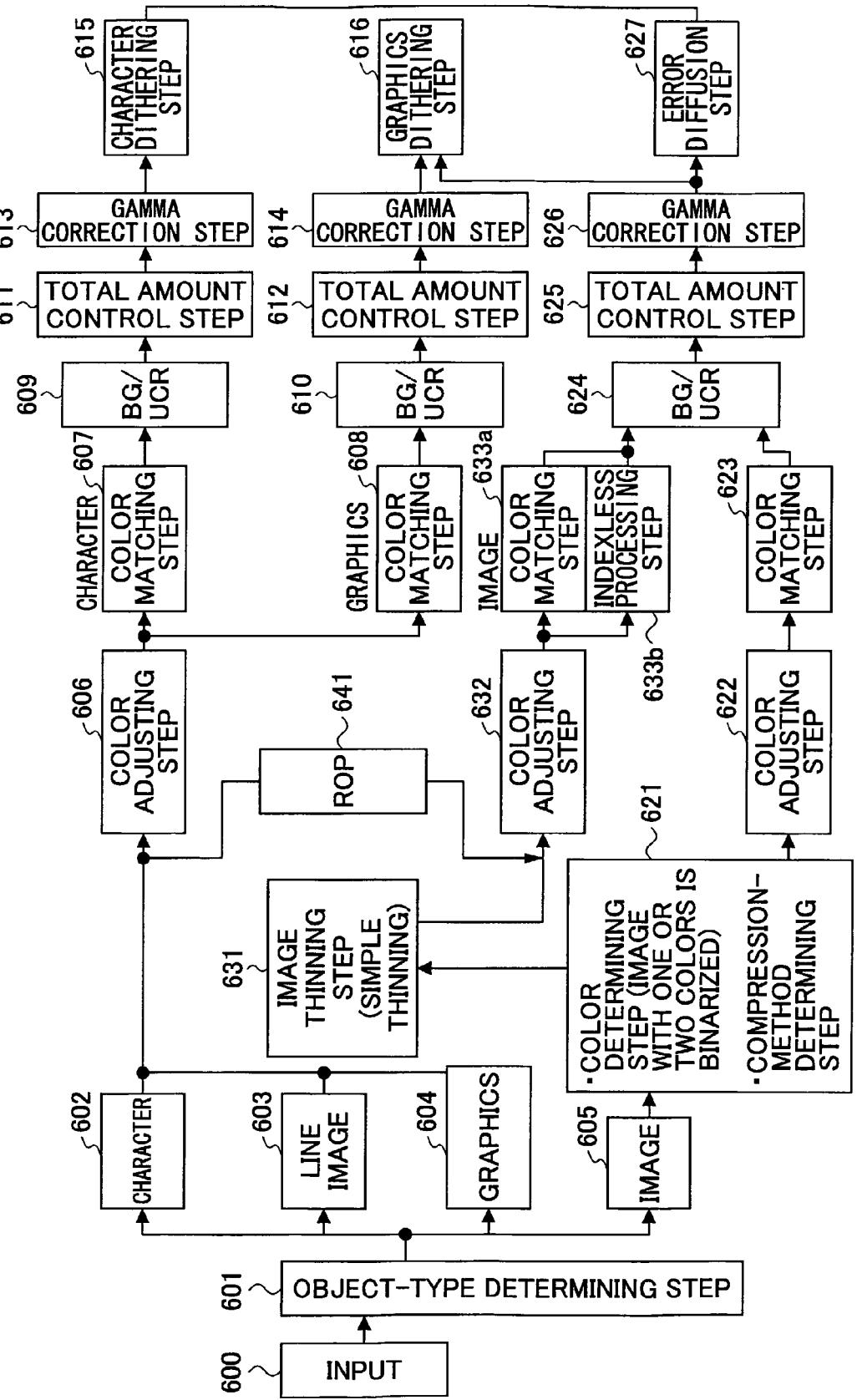
FIG. 10 is a block diagram illustrating exemplary image processing by the exemplary printer driver shown in FIG. 8.

Exemplary image processing performed by the printer driver 411 of the image processing apparatus 400 is described with reference to a block diagram shown in FIG. 10.

When a print instruction is output from an application program running on a data processing apparatus such as a personal computer, the printer driver 411 determines the types of objects in an input (image data) 600 of the print instruction in an object-type determining step 601. Each of the objects, character image data 602, line image data 603, graphics image data 604, and bitmap image data 605, is processed through a corresponding processing path.

On the character image data 602, the line image data 603, and the graphics image data 604, a color adjusting step 606 is first performed. On the character image data 602, a color matching step 607, a BG/UCR step 609, a total amount control step 611, a gamma correction step 613, and a character dithering (halftone processing) step 615 are further performed. On the line image data 603 and the graphics image data 604, a color matching step 608, a BG/UCR step 610, a total amount control step 612, a gamma correction step 614, and a graphics dithering (halftone processing) step 616 are further performed.

On the bitmap image data 605, a color and compression-method determining step 621 is first performed. When the bitmap image data 605 have more than two colors, a color adjusting step 622, a color matching step 623, a BG/UCR step 624, a total amount control step 625, a gamma correction step 626, and an error diffusion (halftone processing) step 627 are further performed. When the bitmap image data 605 have one or two colors, an image thinning step 631, a color adjusting step 632, a color matching step 633a or an indexless processing step 633b (processing where no color matching is performed), a BG/UCR step 624, a total amount control step 625, a gamma correction step 626, and an error diffusion (halftone processing) step 627 are further performed.

Also, the line image data 603 and the graphics image data 604 may be processed through a different processing path that branches to an ROP step 641. In this case, following the ROP step 641, the color adjusting step 632 and the subsequent steps are performed on the line image data 603 and the graphics image data 604.

After the above processing, all the objects are combined again into a single set of image data. A rasterizing step (not shown) is performed on the combined image data and the image data is sent to an image forming apparatus.

The present invention relates to halftone processing using a dither matrix in image processing as described above.

Figure 11:
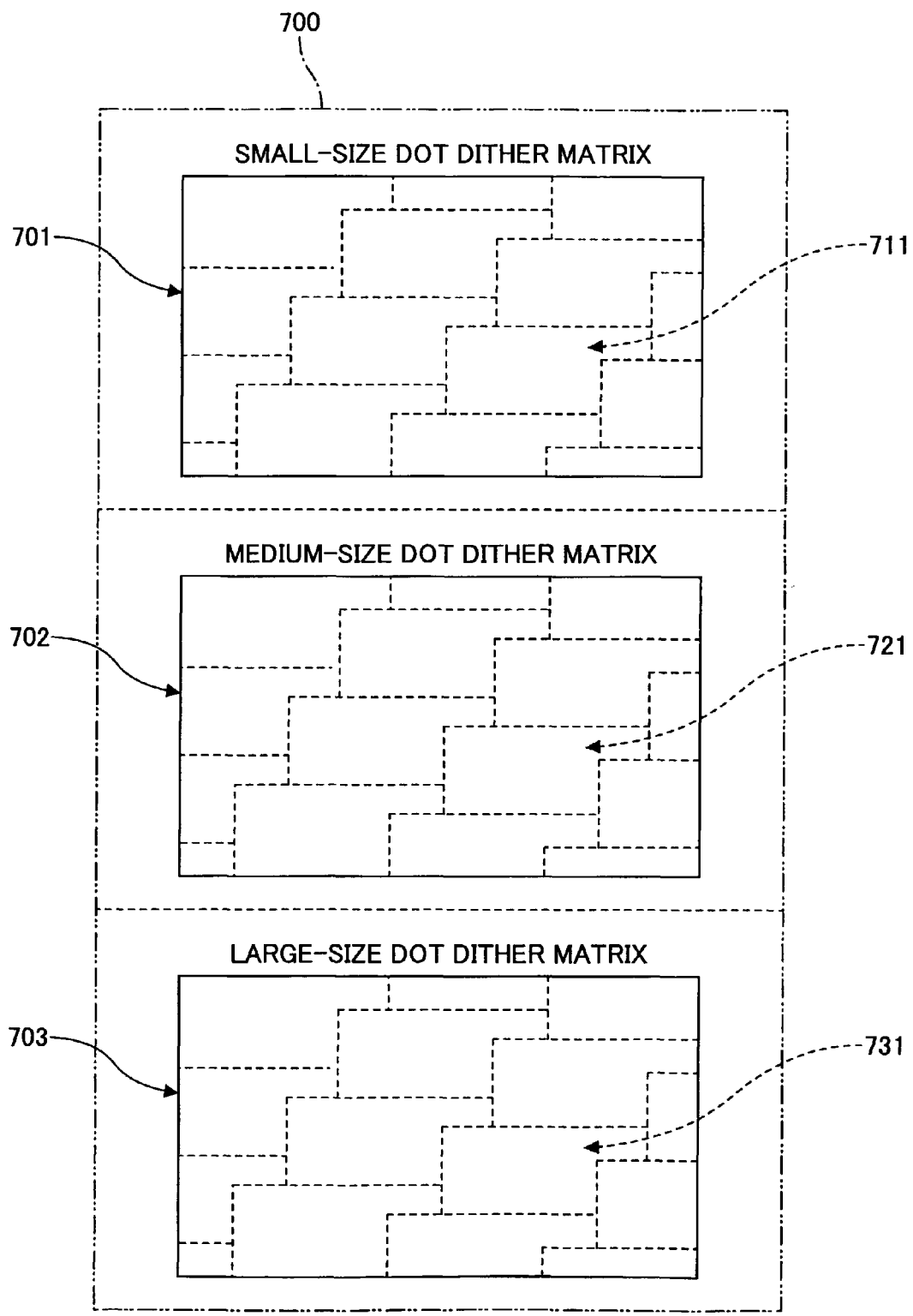
FIG. 11 is a drawing illustrating exemplary dither matrices according to an embodiment of the present invention.
Figure 12:
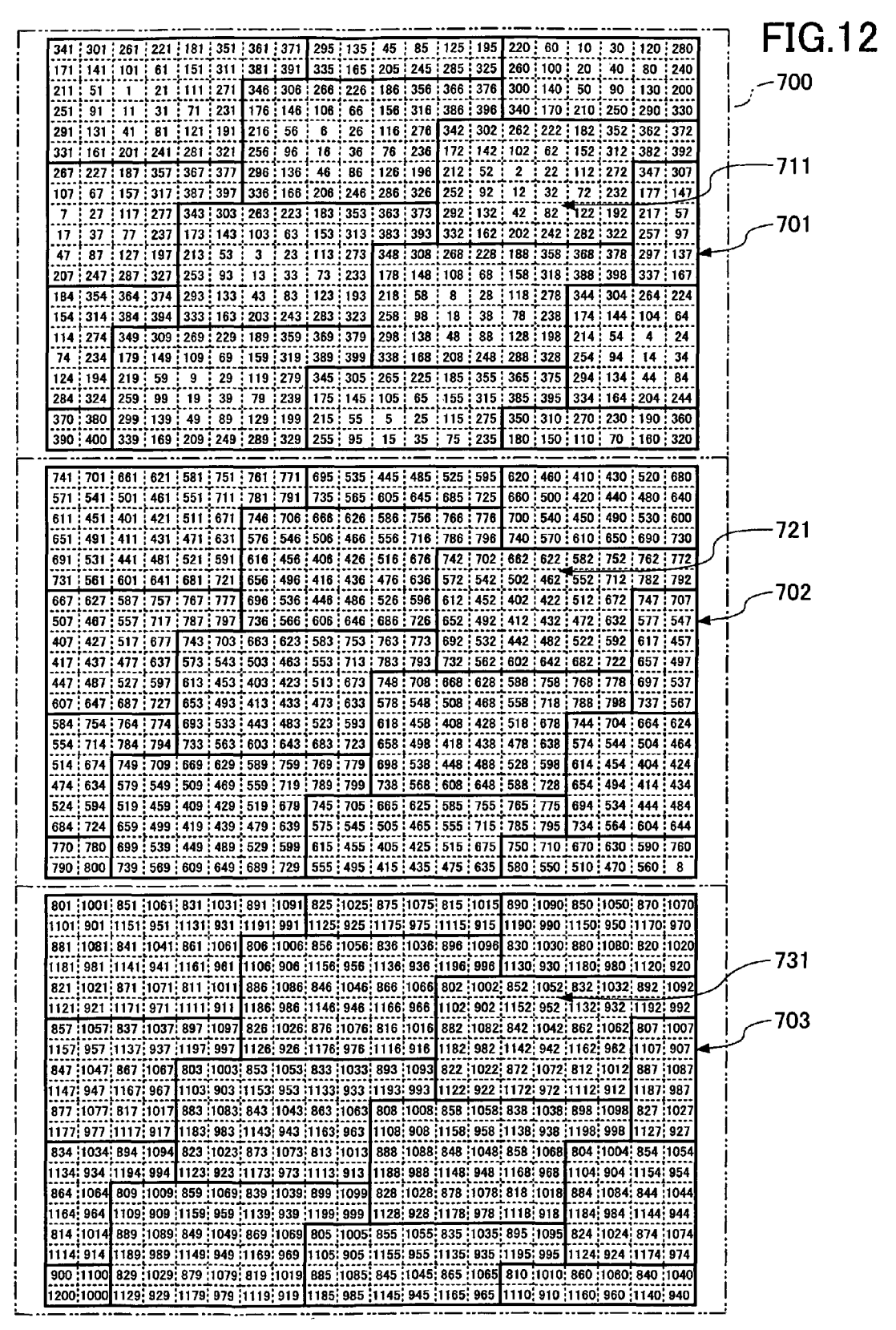

Exemplary dither matrices according to an embodiment of the present invention are described below with reference to FIGS. 11 through 14. FIG. 11 is a schematic diagram illustrating the exemplary dither matrices. FIG. 12 is a drawing showing exemplary threshold values in the exemplary dither matrices. FIG. 13 is a drawing used to describe one of the exemplary dither matrices shown in FIG. 12. FIG. 14 is a drawing used to describe an exemplary concentration type submatrix and an exemplary dispersion type submatrix.

The recording heads 7 of the exemplary image forming apparatus described above are able to jet liquid drops in three sizes: small-size, medium-size, and large-size. This means the exemplary image forming apparatus is able to reproduce four halftone levels (no dot=0, small-size dot=1, medium-size dot=2, large-size dot=3) using liquid drops of three sizes. The exemplary dither matrices described below are designed for four output halftone levels.

Dither matrices 700 are made up of a small-size dot dither matrix 701, a medium-size dot dither matrix 702, and a large-size dot dither matrix 703.

In the exemplary image processing according to an embodiment of the present invention, the output halftone level of a pixel in an input image is determined by comparing the halftone value of the pixel with corresponding threshold values in the dither matrices 700. When the halftone value of the pixel is lower than a corresponding threshold value in the small-size dot dither matrix 701, the output halftone level of the pixel becomes 0. When the value of the pixel is lower than a corresponding threshold value in the medium-size dot dither matrix 702, the output halftone level of the pixel becomes 1. When the value of the pixel is lower than a corresponding threshold value in the large-size dot dither matrix 703, the output halftone level of the pixel becomes 2. When the value of the pixel is larger than a corresponding threshold value in the large-size dot dither matrix 703, the output halftone level of the pixel becomes 3.

In this embodiment, a dither matrix, for example, the small-size dot dither matrix 701, is defined as a table of threshold values having 20 rows and 20 columns (20×20) as shown in FIG. 13. However, the size of a dither matrix is not limited to 20×20. For example, the size of a dither matrix may be 20×40, 40×40, or 256×256.

The small-size dot dither matrix 701 is made up of multiple submatrices 711. The submatrices 711 constitute the small-size dot dither matrix 701 and are used as units when placing dots in the small-size dot dither matrix 701. The shape and arrangement of the submatrices 711 determine a halftone dot pattern and screen lines in the small-size dot dither matrix 701. The shape of the submatrix 711 is not limited to that shown in FIGS. 11 through 13. The submatrix 711 can be of any shape that can fill the small-size dot dither matrix 701 without overlap. In this embodiment, the submatrix 711 is composed of a square of 6×6 dots and a square of 2×2 dots and forms a screen angle of sin (6/2).

The medium-size dot dither matrix 702 and the large-size dot dither matrix 703 are also made up of submatrices 721 and submatrices 732, respectively.

Dot arrangement orders in a concentration type submatrix and a dispersion type submatrix are described below with reference to FIG. 14.

In a concentration type submatrix shown in FIG. 14, dots are arranged so as to concentrate around a point. On the other hand, in a dispersion type submatrix shown in FIG. 14, dots are arranged so as not to concentrate but to disperse.

There are several ways to determine the dot arrangement order in a concentration type submatrix. For example, in a dot arrangement order, dots are placed in ascending order of geometric linear distances from a center point; and in another dot arrangement order, dots are placed continuously in spiral order around a center point. In a dispersion type submatrix, for example, dots may be placed according to the Bayer patter; dots may be placed in an order that causes the entire dither matrix to have high-pass filter characteristics; or dots may be placed in random order. Any dot arrangement order that can form a concentrated or dispersed dot arrangement pattern may be used.

As described above, the dither matrices 700 are designed to be used in image processing where four output halftone levels (no dot=0, small-size dot=1, medium-size dot=2, large-size dot=3) are used. In the dither matrices 700, the submatrices 711 of the small-size dot dither matrix 701 and the submatrices 721 of the medium-size dot dither matrix 711 are concentration type submatrices; and the submatrices 731 of the large-dot dither matrix 703 are dispersion type submatrices.

Accordingly, in a dithering process using the dither matrices 700 where input image data having M input halftone levels are converted into output image data having N (M>N>2) output halftone levels, a concentration type dot arrangement order is used for output halftone levels of 0 (=no dot), 1 (=small-size dot), and 2 (=medium-size dot) that are lower than a predetermined threshold level T (N>T>1) (in this example, T=3), and a dispersion type dot arrangement order is used for an output halftone level of 3 (=large-size dot) that is equal to or higher than the predetermined threshold level T.

More precisely, an embodiment of the present invention provides a dither matrix used in halftone processing for converting input image data having M input halftone levels into output image data having N (M>N>2) output halftone levels.

In the halftone processing, a concentration type dither matrix is used as the dither matrix when an input halftone level is within a range of input halftone levels corresponding to an output halftone level that is lower than a predetermined threshold level T (N>T>1), and a dispersion type dither matrix is used as the dither matrix when the input halftone level is within a range of input halftone levels corresponding to an output halftone level that is equal to or higher than the predetermined threshold level T. In other words, in the halftone processing, a concentration type dither matrix is used as the dither matrix when an input halftone level is within a predetermined range of input halftone levels assigned to an output halftone level that is lower than a predetermined threshold level T (N>T>1), and a dispersion type dither matrix is used as the dither matrix when the input halftone level is within a predetermined range of input halftone levels assigned to an output halftone level that is equal to or higher than the predetermined threshold level T.

In still other words, a concentration type dot arrangement order is used for low output halftone levels because concentrating small dots provides favorable effects; and a dispersion type dot arrangement order is used for high output halftone levels because concentrating large dots causes problems such as bleeding and beading. In this embodiment, a concentration type dot arrangement order is switched to a dispersion type dot arrangement order when an output halftone level is equal to or higher than 3 (large-size dot, threshold level T=3). However the threshold level T is not limited to 3, but any output halftone level may be used as the threshold level T.

As described above, in a dither matrix according to an embodiment of the present invention, multiple submatrices are arranged at a screen angle with no space between them and without overlap so that output pixels form a halftone dot pattern or screen lines. Also, according to an embodiment of the present invention, submatrices with a concentration type dot arrangement order are used for an output halftone level that is lower than a predetermined threshold level T, and submatrices with a dispersion type dot arrangement order are used for an output halftone level that is equal to or higher than the predetermined threshold level T. This makes it possible to form a concentration type halftone dot pattern with a certain screen angle, while preventing problems such as bleeding and beading caused by concentration of dots by using a dispersion type dot arrangement order for high halftone levels. Therefore, using a dither matrix according to an embodiment of the present invention improves image quality.

More precisely, concentration type submatrices are used as the submatrices when the input halftone level is within a range of input halftone levels corresponding to an output halftone level that is lower than the predetermined threshold level T; and dispersion type submatrices are used as the submatrices when the input halftone level is within a range of input halftone levels corresponding to an output halftone level that is equal to or higher than the predetermined threshold level T. In other words, concentration type submatrices are used as the submatrices when the input halftone level is within a predetermined range of input halftone levels assigned to an output halftone level that is lower than the predetermined threshold level T; and dispersion type submatrices are used as the submatrices when the input halftone level is within a predetermined range of input halftone levels assigned to an output halftone level that is equal to or higher than the predetermined threshold level T.

Also, according to another embodiment of the present invention, when the input halftone level is a highest input halftone level in a predetermined range of input halftone levels assigned to a highest output halftone level (T−1) of the concentration type submatrices, the output halftone level (T−1) is used throughout the concentration type submatrices.

Figure 15:
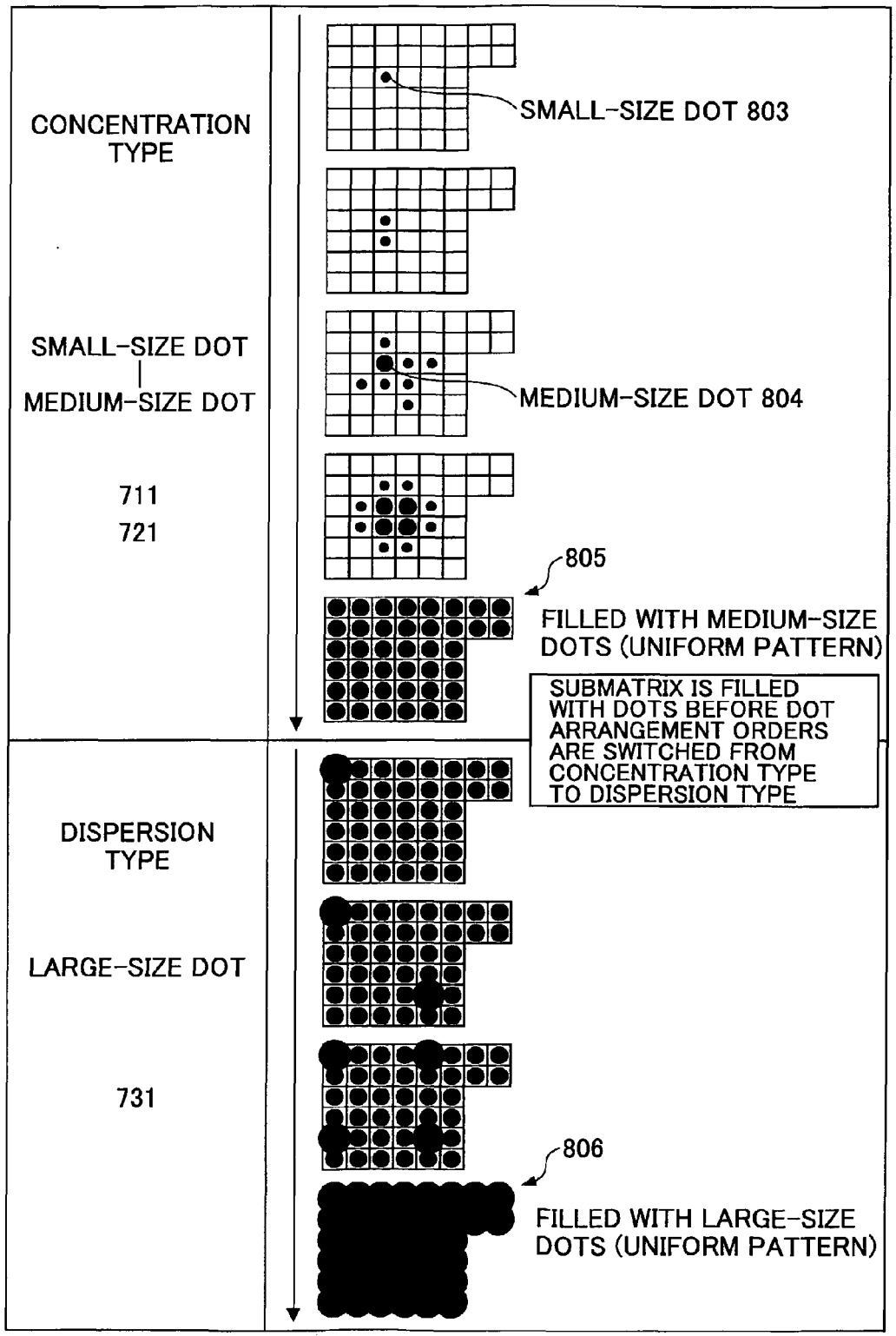
FIG. 15 is a drawing illustrating an exemplary transition process from a concentration type dot arrangement order to a dispersion type dot arrangement order.

An exemplary transition process from a concentration type dot arrangement order to a dispersion type dot arrangement order is described below with reference to FIG. 15.

In this embodiment, as described above, a dispersion type dot arrangement order is used for an output halftone level that is equal to or higher than 3 (large-size dot) (dispersion type dot arrangement stage) and a concentration type dot arrangement order is used for output halftone levels that are lower than 3 (concentration type dot arrangement stage).

In the concentration type dot arrangement stage, a concentration type halftone dot pattern is formed by using the submatrix 711 of the small-size dot dither matrix 701 and the submatrix 721 of the medium-size dot dither matrix 702. For the submatrix 711, small-size dots 803 are used; and for the submatrix 721, medium-size dots 804 are used. At the end of the concentration type dot arrangement stage, the submatrix 721 is filled with the medium-size dots 804 and a halftone dot pattern 805 is formed. In the dispersion type dot arrangement stage, a dispersion type halftone dot pattern is formed with large-dots by using the submatrix 731 of the large-size dot dither matrix 703, over the halftone dot pattern 805 where all the cells are filled with the medium-size dots 804. At the end of the dispersion type dot arrangement stage, the submatrix 731 is filled with large-size dots and a halftone dot pattern 806 is formed.

According to an embodiment of the present invention, as described above, a submatrix is filled with dots before the dot arrangement orders are switched from a concentration type to a dispersion type. This makes it possible to reproduce the maximum density possible with an output halftone level at which dot concentration does not cause problems. Also, since the submatrix is filled with dots before the dot arrangement orders are switched from a concentration type to a dispersion type, a dispersion type dot arrangement order can be determined independently of the concentration type dot arrangement order.

Figure 16:
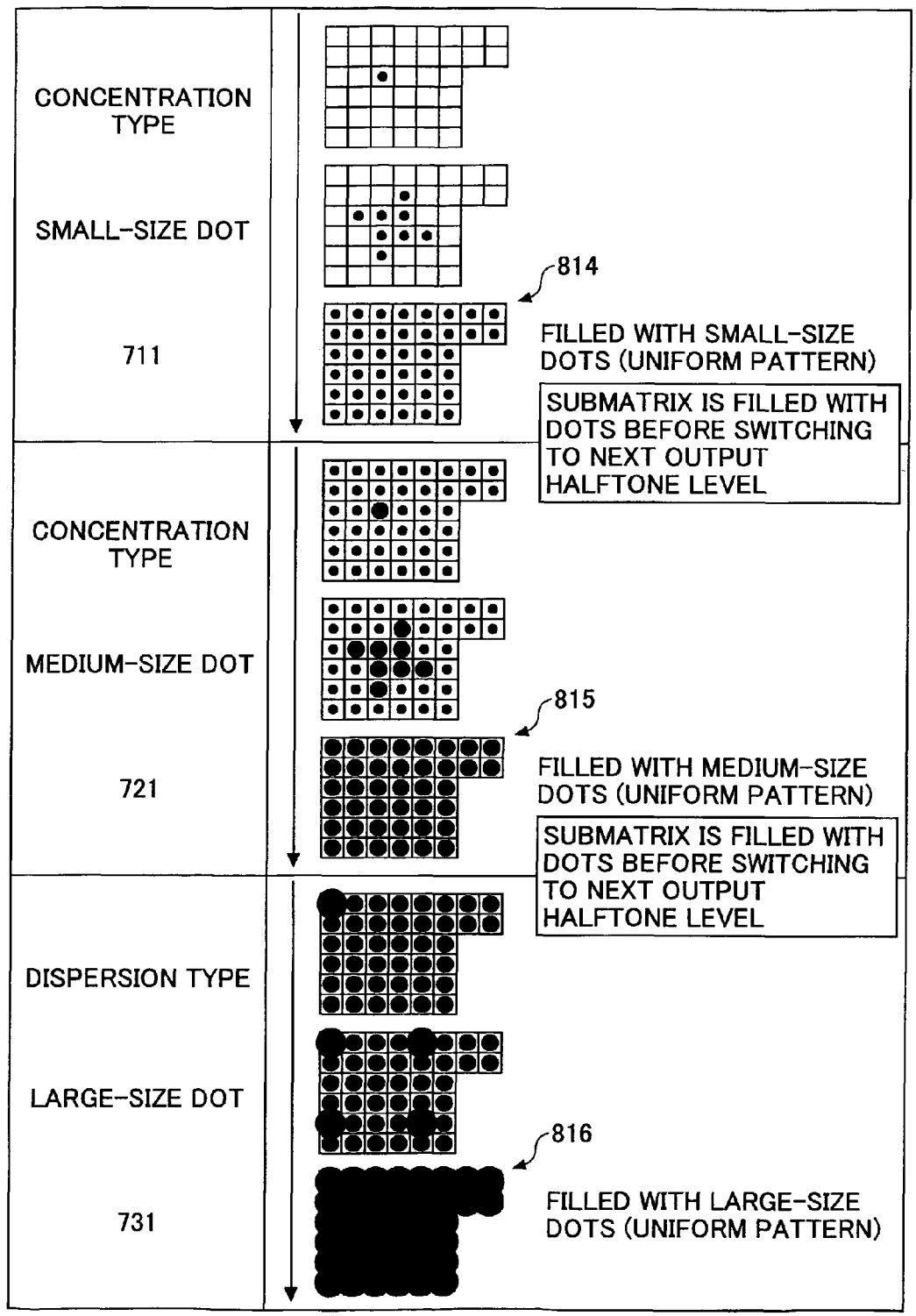
FIG. 16 is a drawing illustrating another exemplary transition process from a concentration type dot arrangement order to a dispersion type dot arrangement order.

Another exemplary transition process from a concentration type dot arrangement order to a dispersion type dot arrangement order is described below with reference to FIG. 16.

This exemplary transition process has three stages: a concentration type dot arrangement stage for output halftone level 1 (small-size dot), a concentration type dot arrangement stage for output halftone level 2 (medium-size dot), and a dispersion type dot arrangement stage for output halftone level 3 (large-size dot). At the end of each stage, submatrices are filled with dots. In the concentration type dot arrangement stage for output halftone level 1, a concentration type halftone dot pattern is formed with small-size dots by using the submatrix 711 of the small-size dot dither matrix 701. At the end of the concentration type dot arrangement stage for output halftone level 1, the submatrix 711 is filled with small-size dots and a halftone dot pattern 814 is formed. In the concentration type dot arrangement stage for output halftone level 2, a concentration type halftone dot pattern is formed with medium-size dots by using the submatrix 721 of the medium-size dot dither matrix 702. At the end of the concentration type dot arrangement stage for output halftone level 2, the submatrix 721 is filled with medium-size dots and a halftone dot pattern 815 is formed. In the dispersion type dot arrangement stage for output halftone level 3, a dispersion type halftone dot pattern is formed with large-size dots by using the submatrix 731 of the large-size dot dither matrix 703. At the end of the dispersion type dot arrangement stage for output halftone level 3, the submatrix 731 is filled with large-size dots and a halftone dot pattern 816 is formed.

In this example, as described above, a submatrix is filled with dots (a uniform pattern is formed) before switching from the concentration type dot arrangement stage for output halftone level 1 to the concentration type dot arrangement stage for output halftone level 2, and before switching from the concentration type dot arrangement stage for output halftone level 2 to the dispersion type dot arrangement stage for output halftone level 3.

Forming a uniform pattern at each output halftone level makes it possible to increase dot coverage on paper at a low halftone level, and thereby prevents occurrences of irregular white spots in an image formed on a paper on which ink does not spread smoothly.

An exemplary dot arrangement order among multiple submatrices constituting a dither matrix is described below with reference to FIG. 17. In the description below, the small-size dot dither matrix 701 is used as an example. However, the description also applies to the medium-size dot dither matrix 702 and the large-size dot dither matrix 703.

Figure 17:
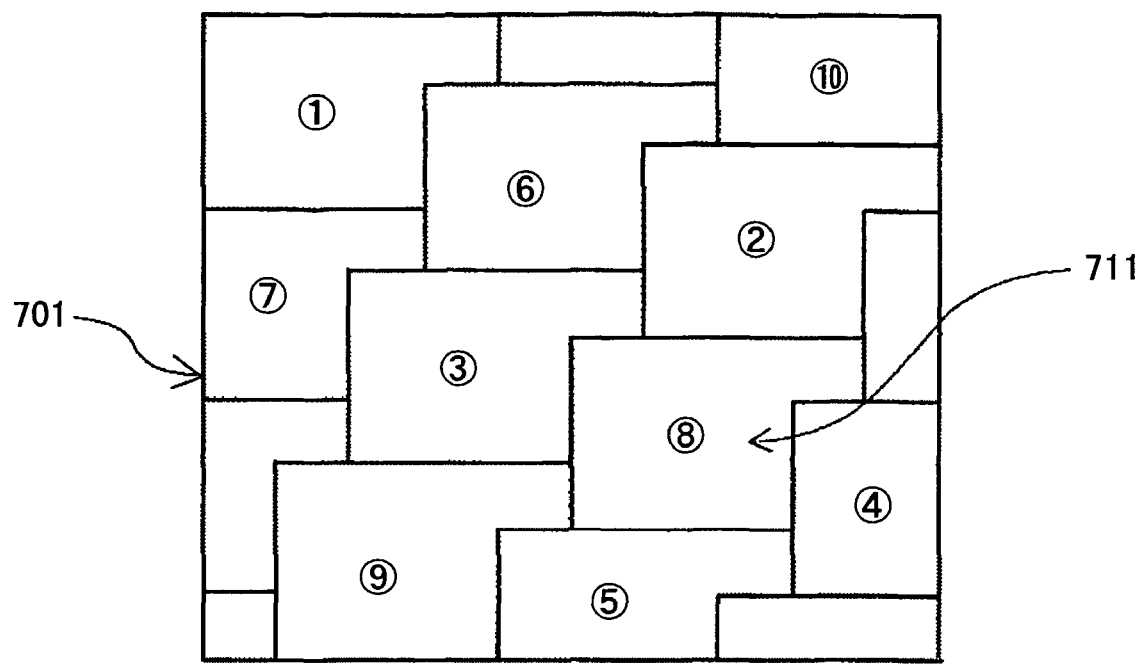
FIG. 17 is a drawing illustrating an exemplary dot arrangement order among multiple submatrices.

In the dither matrix 701 shown in FIG. 17, dots are placed in the submatrices 711 in the order indicated by circled numbers 1 through 10. In this exemplary dot arrangement order, the submatrices 711 are selected alternately in oblique directions so that adjoining submatrices 711 are not selected successively. In other words, adjoining submatrices 711 do not have consecutive threshold values.

As described above, according to an embodiment of the present invention, submatrices are arranged so that dots are not concentrated in a part of a dither matrix and the formed pattern does not look like a texture.

The arrangement of submatrices is not limited to that described above as long as dots are not concentrated in a part of a dither matrix. For example, submatrices may be arranged in random order or in an order that causes the dither matrix to have high-pass filter characteristics.

Dither matrices used for a color image having multiple color planes are described below.

Figure 18A:
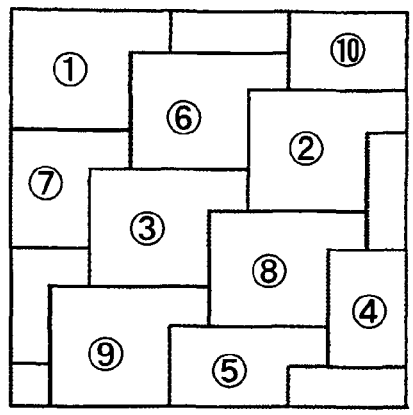
FIGS. 18A through 18D are drawings illustrating a base dither matrix, a rotated dither matrix, an inverted dither matrix, and a translated dither matrix.
Figure 18B:
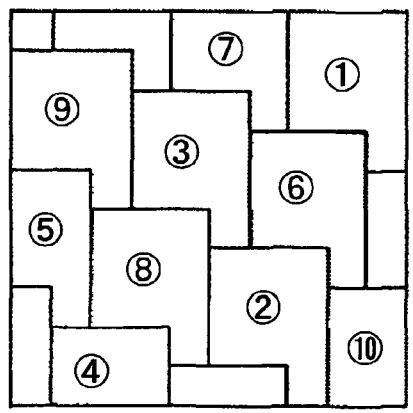
Figure 18C:
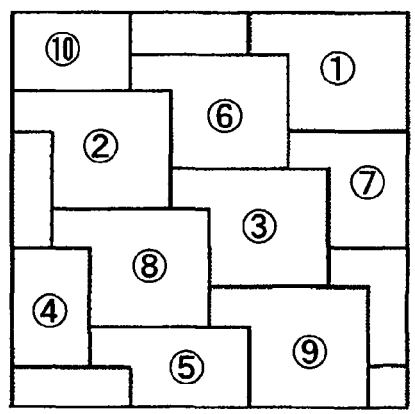
Figure 18D:
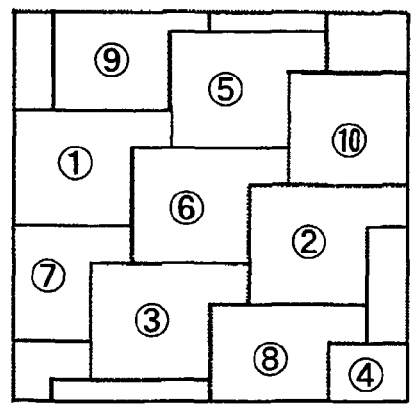

Exemplary dither matrices shown in FIGS. 18B through 18D are created by rotating, inverting, or translating the base dither matrix shown in FIG. 18A, which base dither matrix is prepared as described above. The created dither matrices can be used for color planes of a color image. The rotated dither matrix shown in FIG. 18B is created by rotating the base dither matrix 90 degrees clockwise. The inverted dither matrix shown in FIG. 18C is created by inverting the base dither matrix symmetrically with respect to the vertical center line. The translated dither matrix shown in FIG. 18D is created by translating the base matrix 5 dots downward.

For example, a dither matrix as shown in FIG. 11 may be used as a base dither matrix for the cyan color plane; and dither matrices for the black, magenta, and yellow color planes may be created by translating the base dither matrix downward 5 dots, 10 dots, and 15 dots, respectively.

Figure 19:
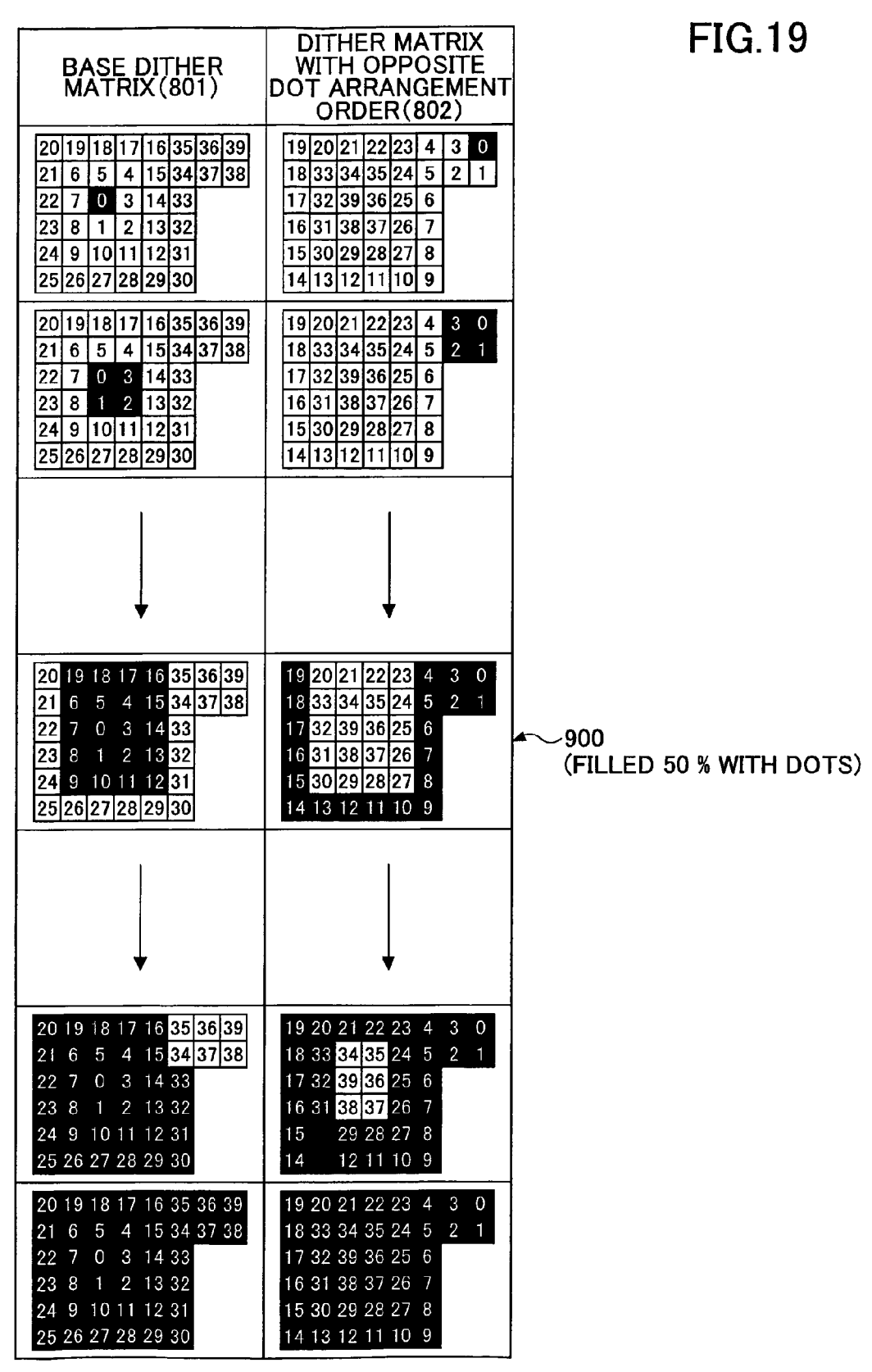

FIG. 19 is a drawing illustrating a base dither matrix and a dither matrix having an opposite dot arrangement order to that of the base dither matrix.

As shown in FIG. 19, dots are placed in opposite dot arrangement orders in a base dither matrix 801 and a dither matrix 802. When the base dither matrix 801 is used for a color plane and the dither matrix 802 is used for another color plane, halftone dot patterns of the two color planes do no overlap in halftone levels equal to or lower than that of halftone dot patterns 900 where 50% of the dither matrices are filled with dots.

As described above, when dither matrices created by rotating, inverting, or translating a base dither matrices or dither matrices having opposite dot arrangement orders are used for color planes of a color image, dots of different colors can be formed so as not to overlap too much. Such a method makes it possible to form a secondary or higher color without changing its hue. Also, such a method makes it possible to increase dot coverage on paper, to prevent occurrences of irregular white spots in an image, and thereby to improve image quality.

In the embodiments described above, each submatrix is shaped like a combination of two squares of different sizes. However, a submatrix can be of any shape that can fill a dither matrix without overlap. For example, a submatrix can be shaped like a combination of two rectangles of different sizes. The screen angle and screen frequency of a halftone dot pattern can be adjusted by changing the size of rectangles. Also, using vertically shifted patterns for color planes makes it possible to produce a color image with less moiré and less hue distortion.

When processing image data of an image to be formed on a paper (recording medium) on which liquid drops do not spread smoothly but clump together, using a dither matrix according to an embodiment of the present invention for halftone processing provides beneficial effects. Examples of papers with such characteristics are described below with reference to FIGS. 20A through 20C.

An offset paper, which has a coating layer on its surface and is used, for example, for gravure printing of magazines, is an example of a paper (recording medium) having the above characteristics. Examples offset papers include POD Gloss Coat (Oji paper Co., Ltd.), Super MI dull (Nippon Paper Industries Co., Ltd.), and Space DX (Nippon Paper Industries Co., Ltd.).

FIG. 20A shows the behavior of ink drops on a silk gloss paper; 20B shows the behavior on a plain paper; and 20C shows the behavior on a gloss paper. When ink drops D are jetted onto a silk gloss paper, the ink drops D do not spread and are isolated from each other. On a plain paper, the ink drops D spread and bleed. On a gloss paper, the ink drops D do not spread or bleed as in the case of a plain paper and are not isolated from each other as in the case of a silk gloss paper. Instead, adjoining ink drops D tend to clump together and may cause overflow of ink (beading).

An exemplary paper (recording medium) according to an embodiment of the present invention is described below.

An exemplary recording medium according to an embodiment of the present invention is composed of a base material and a coating layer on at least one side of the base material. Also, the exemplary recording medium may have additional layers.

<Base Material>

Various materials may be used for the base material depending on the purpose of paper. For example, a sheet of paper mainly made of wood fibers and a nonwoven fabric mainly made of wood and synthetic fibers may be used.

A sheet of paper may be made of wood pulp or recycled pulp. Examples of wood pulp are leaf bleached kraft pulp (LBKP), needle bleached kraft pulp (NBKP), NBSP, LBSP, GP, and TMP.

As materials of recycled pulp, recycled papers in the list of standard qualities of recycled papers of the Paper Recycling Promotion Center may be used. For example, chemical pulp or high-yield pulp made of recycled papers may be used as the base material. Such recycled papers include printer papers such as non-coated computer paper, thermal paper, and pressure-sensitive paper; OA papers such as plain paper; coated papers such as art paper, ultra-lightweight coated paper, and matt paper; and non-coated papers such as bond paper, color bond paper, note paper, letter paper, warpping paper, fancy paper, medium quality paper, newspaper, woody paper, supermarket flyers, simili paper, pure-white roll paper, and milk cartons. The above substances may be used individually or in combination.

Normally, recycled pulp is made by the following four steps:

(1) A defibrating step of breaking down used paper into fibers and separating ink from the fibers by using a mechanical force and a chemical in a pulper.

(2) A dust removing step of removing foreign substances (such as plastic) and dust in the used paper by using, for example, a screen and a cleaner.

(3) A deinking step of expelling the ink separated by a surfactant from the fibers by using a flotation method or a cleaning method.

(4) A bleaching method of bleaching the fibers by oxidization or reduction.

When mixing recycled pulp with wood pulp, the percentage of recycled pulp is preferably 40% or lower so that produced paper does not curl after recording.

As an internal filler for the base material, a conventional white pigment may be used. For example, the following substances may be used as a white pigment: an inorganic white pigment such as precipitated calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithophone, zeolite, magnesium carbonate, or magnesium hydrate; and an organic pigment such as styrene plastic pigment, acrylic plastic pigment, polyethylene, microcapsule, urea resin, or melamine resin. The above substances may be used individually or in combination.

As an internal sizing agent used when producing the base material, a neutral rosin size used for neutral papermaking, alkenyl succinic anhydride (ASA), alkyl ketene dimer (AKD), or a petroleum resin size may be used. Especially, a neutral rosin size and alkenyl succinic anhydride are preferable. Alkyl ketene dimer has a high sizing effect and therefore provides an enough sizing effect with a small amount. However, since alkyl ketene dimer reduces the friction coefficient of the surface of recording paper (medium), recording paper made using alkyl ketene dimer may cause a slip when being conveyed in an ink jet recording apparatus.

<Coating Layer>

The coating layer contains a pigment and a binder, and may also contain a surfactant and other components.

As a pigment, an inorganic pigment or a mixture of an inorganic pigment and an organic pigment may be used.

For example, kaolin, talc, heavy calcium carbonate, precipitated calcium carbonate, calcium sulfite, amorphous silica, alumina, titanium white, magnesium carbonate, titanium dioxide, aluminum hydroxide, calcium hydrate, magnesium hydrate, zinc hydroxide, or chlorite may be used as an inorganic pigment. Especially, kaolin provides a high gloss surface similar to that of an offset paper and is therefore preferable.

There are several types of kaolin, for example, delaminated kaolin, calcined kaolin, and engineered kaolin made by surface modification. To provide a high gloss surface, the mass percentage of a type of kaolin, in which 80 or more mass percent of particles have a diameter of 2 µm or lower, in the total amount of kaolin is preferably 50 percent or more.

The amount of kaolin in the total amount of pigment in the coating layer is preferably 50 mass percent or more. If the mass ratio of kaolin is lower than 50, sufficient glossiness may not be obtained. There is no specific limit to the amount of kaolin. However, when the fluidity and the thickening property of kaolin under a high shearing force are taken into account, the mass ratio of kaolin is preferably 90 or lower in terms of coatability.

As an organic pigment, a water-soluble dispersion of, for example, styrene-acrylic copolymer particles, styrene-butadiene copolymer particles, polystyrene particles, or polyethylene particles may be used. The above organic pigments may be used in combination.

The amount of an organic pigment in the total amount of pigment in the coating layer is preferably 2-20 mass percent. An organic pigment as described above has a specific gravity lower than that of an inorganic pigment and therefore provides a thick, high-gloss coating layer having a good coatability. If the mass percentage of an organic pigment is less than 2 percent, a desired effect is not obtained. If the mass percentage of an organic pigment is more than 20 percent, the fluidity of a coating liquid becomes too low and, as a result, the efficiency of a coating process decreases and the operational costs increase.

Organic pigments can be divided into several types according to their particle shapes: solid-shape, hollow-shape, and doughnut-shape. To achieve a good balance between the glossiness, coatability, and fluidity of a coating liquid, an organic pigment having hollow-shaped particles with a void percentage of 40 percent or higher and an average diameter of between 0.2 and 3.0 µm is preferable.

As a binder, a water-based resin is preferably used.

As a water-based resin, a water-soluble resin or a water-dispersible resin may be used. Any type of water-based resin may be used depending on the purpose. For example, the following water-based resins may be used: polyvinyl alcohol; a modified polyvinyl alcohol such as anion-modified polyvinyl alcohol, cation-modified polyvinyl alcohol, or acetal-modified polyvinyl alcohol; polyurethane; polyvinyl pyrrolidone; a modified polyvinyl pyrrolidone such as polyvinyl pyrrolidone-vinyl acetate copolymer, vinyl pyrrolidone-dimethylaminoethyl methacrylate copolymer, quaternized vinyl pyrrolidone-dimethylaminoethyl methacrylate copolymer, or vinyl pyrrolidone-methacrylamide propyl trimethyl ammonium chloride copolymer; cellulose such as carboxymethyl cellulose, hydroxyethyl cellulose, or hydroxypropylcellulose; modified cellulose such as cationized hydroxyethyl cellulose; polyester, polyacrylic acid (ester), melamine resin, or modified versions of these substances; synthetic resin made of polyester-polyeurethane copolymer; and other substances such as poly(metha)acrylic acid, poly(metha)acrylamide, oxidized starch, phosphorylated starch, self-denatured starch, cationized starch, other modified starches, polyethylene oxide, polyacrylic acid soda, and alginic acid soda. The above substances may be used individually or in combination.

Among the above substances, polyvinyl alcohol, cation-modified polyvinyl alcohol, acetal-modified polyvinyl alcohol, polyester, polyurethane, and polyester-polyeurethane copolymer are especially preferable in terms of ink-absorption rate.

Any type of water-dispersible resin may be used depending on the purpose. For example, the following water-dispersible resins may be used: polyvinyl acetate, ethylene-polyvinyl acetate copolymer, polystyrene, styrene-(metha)acrylic ester copolymer, (metha)acrylic ester polymer, polyvinyl acetate-(metha)acrylic acid (ester) copolymer, styrene-butadiene copolymer, an ethylene-propylene copolymer, polyvinyl ether, and silicone-acrylic copolymer. A water-dispersible resin may contain a cross-linking agent such as methylol melamine, methylol hydroxypropylene urea, or isocyanate. Also, a self-crosslinking copolymer containing a unit of methylol acrylamide may be used as a water-dispersible resin. Two or more of the water-dispersible resins described above may be used at the same time.

The mass ratio of the water-based resin to the pigment in the coating layer is preferably 2:100 to 100:100, and more preferably 3:100 to 50:100. The amount of the water-based resin in the coating layer is determined so that the liquid-absorption rate of a recording medium falls within a preferable range.

When a water-dispersible colorant is used, whether to mix a cationic organic compound in the binder is optional. For example, primary to tertiary amines that react with sulfonic groups, carboxyl groups, or amino groups of a direct dye or an acid dye in a water-soluble ink, and form insoluble salt; or a monomer, oligomer, or polymer of quarternary ammonium salt may be used. Among them, an oligomer and a polymer of quarternary ammonium salt are especially preferable.

As a cationic organic compound, the following substances may be used: dimethylamine-epichlorohydrin polycondensate, dimethylamine-ammonia-epichlorohydrin condensate, poly(trimethyl aminoethyl-methacrylate methylsulfate), diallylamine hydrochloride-acrylamide copolymer, poly(diallylamine hydrochloride-sulfur dioxide), polyallylamine hydrochlorid, poly(allylamine hydrochlorid-diallylamine hydrochloride), acrylamide-diallylamine copolymer, polyvinylamine copolymer, dicyandiamide, dicyandiamide-ammonium chloride-urea-formaldehyde condensate, polyalkylene polyamine-dicyandiamide ammonium salt consensate, dimethyl diallyl ammonium chloride, poly diallyl methyl amine hydrochloride, poly(diallyl dimethyl ammonium chloride), poly(diallyl dimethyl ammonium chloride-sulfur dioxide), poly(diallyl dimethyl ammonium chloride-diallyl amine hydrochloride derivative), acrylamide-diallyl dimethyl ammonium chloride copolymer, acrylate-acrylamide-diallyl amine hydrochloride copolymer, polyethylenimine, ethylenimine derivative such as acrylamide polymer, and modified polyethylenimine alkylene oxide. The above substances may be used individually or in combination.

It is preferable to use a cationic organic compound with a low-molecular weight such as dimethylamine-epichlorohydrin polycondensate or polyallylamine hydrochlorid and a cationic organic compound with a relatively-high molecular weight such as poly(diallyl dimethyl ammonium chloride) in combination. Compared with a case where only one cationic organic compound is used, using cationic organic compounds in combination improves image density and reduces feathering.

The equivalent weight of cation in a cationic organic compound obtained by the colloid titration method (performed using polyvinyl potassium sulfate and toluidine blue) is preferably between 3 and 8 meq/g. With an equivalent weight in the above range, the dry deposit mass of the cationic organic compound falls within a preferable range.

In the measurement of the equivalent weight of cation, the cationic organic compound is diluted with distilled water so that the solid content in the solution becomes 0.1 mass percent. No pH control is performed.

The dry deposit mass of the cationic organic compound is preferably between 0.3 and 2.0 $g/m^2$. If the dry deposit mass of the cationic organic compound is lower than 0.3 $g/m^2$, sufficient improvement in image density and sufficient reduction in feathering may not be achieved.

Any type of surfactant may be used depending on the purpose. For example, an anion surfactant, a cation surfactant, an amphoteric surfactant, or a nonionic surfactant may be used. Among the above surfactants, a nonionic surfactant is especially preferable. Adding a surfactant improves water resistance and density of an image, and thereby reduces bleeding.

For example, the following nonionic surfactants may be used: higher alcohol ethylene oxide adduct, alkylphenol ethylene oxide adduct, fatty acid ethylene oxide adduct, polyhydric alcohol fatty acid ester ethylene oxide adduct, higher aliphatic amine ethylene oxide adduct, fatty acid amide ethylene oxide adduct, fatty oil ethylene oxide adduct, ethylene oxide adduct of fat, polypropylene glycol ethylene oxide adduct, glycerol fatty acid ester, pentaerythritol fatty acid ester, sorbitol-sorbitan fatty acid ester, sucrose fatty acid ester, polyhydric alcohol alkyl ether, and alkanolamine fatty acid amide. The above substances may be used individually or in combination.

Polyhydric alcohol is not limited to a specific type and any type of polyhydric alcohol may be used depending on the purpose. For example, glycerol, trimethylolpropane, pentaerythrite, sorbitol, or surcose may be used. Ethylene oxide adduct may be made by replacing a part of ethylene oxide with an alkylene oxide such as propylene oxide or butylene oxide to the extent that the water solubility is not affected. The percentage of the replaced part is preferably 50 percent or lower. The hydrophile-lipophile balance (HLB) of a nonionic surfactant is preferably between 4 and 15, and more preferably between 7 and 13.

The mass ratio of the surfactant to the cationic organic compound is preferably 0:100 to 10:100, and more preferably 0.1:100 to 1:100.

Other components may also be added to the coating layer to the extent that its advantageous effects are not undermined. Examples of other components include additives such as an alumina powder, a pH adjuster, an antiseptic agent, and an antioxidant.

The method of forming the coating layer is not limited to a specific method. For example, the coating layer may be formed by impregnating the base material with a coating liquid or by applying a coating liquid to the base material. For the impregnation or application of a coating liquid, a coater such as a conventional size press, a gate roll size press, a film transfer size press, a blade coater, a rod coater, an air knife coater, or a curtain coater may be used. Using a conventional size press, a gate roll size press, or a film transfer size press attached to a paper machine for the impregnation or application of a coating liquid may improve the efficiency of the process and is therefore preferable.

There is no specific limit to the amount of a coating liquid on the base material. However, the solid content of a coating liquid on the base material is preferably between 0.5 and 20 g/m$^2$, and more preferably between 1 and 15 g/m$^2$. When the solid content of a coating liquid on the base material is less than 0.5 g/m$^2$, the ink-absorption rate of the paper is reduced and, as a result, ink overflow and bleeding may occur. When the solid content of a coating liquid on the base material is more than 20 g/m$^2$, the paper is not easily folded or becomes unsuitable for handwriting.

After the impregnation or application of a coating liquid, the coating liquid may be dried. The temperature for this drying process is preferably between 100 and 250° C., but is not limited to the specific range.

The exemplary recording medium may also have a back layer on the back of the base material, and other layers between the base material and the coating layer or between the base material and the back layer. Also, a protective layer may be provided on the coating layer. Each of the layers may be composed of one layer or multiple layers.

In addition to an ink jet recording medium, any recording medium, for example, coated papers for offset printing or gravure printing, having a preferable liquid-absorption rate as described above may be used.

When the exemplary recording medium was brought into contact with an ink according to an embodiment of the present invention for 100 ms, the amount of the ink transferred onto the exemplary recording medium measured by a dynamic scanning absorptometer was between 2 and 40 ml/m$^2$. This value is preferably between 3 and 30 ml/m$^2$. The amount of pure water transferred onto the exemplary recording medium at a contact time of 100 ms is preferably between 2 and 45 ml/m$^2$, and more preferably between 3 and 30 ml/m$^2$.

When the amount of transferred pure water or ink at a contact time of 100 ms is smaller than the preferable range, beading may occur. When the amount is larger than the preferable range, the diameter of a recorded ink dot may become smaller than a preferable diameter.

When the exemplary recording medium was brought into contact with an ink according to an embodiment of the present invention for 400 ms, the amount of the ink transferred onto the exemplary recording medium measured by a dynamic scanning absorptometer was between 3 and 50 ml/m$^2$. This value is preferably between 4 and 40 ml/m$^2$. The amount of pure water transferred onto the exemplary recording medium at a contact time of 100 ms is preferably between 3 and 50 ml/m$^2$, and more preferably between 4 and 40 ml/m$^2$.

When the amount of transferred pure water or ink at a contact time of 400 ms is smaller than the preferable range, drying property becomes insufficient and spur marks may appear. When the amount is larger than the preferable range, bleeding may occur and the glossiness of an image after dried may become low.

Dynamic scanning absorptometer (DSA: JAPAN TAPPI JOURNAL, Volume 48, May 1994, pp. 88-92, Shigenori Kuga) is an apparatus that can accurately measure the amount of a liquid absorbed during a very short period of time. The dynamic scanning absorptometer directly reads the absorption speed of a liquid from the movement of a meniscus in a capillary and automatically measures the amount of the liquid absorbed. The test sample is shaped like a disc. The dynamic scanning absorptometer scans the test sample by moving an liquid-absorbing head spirally over the test sample and thereby measures the amount of the liquid absorbed at as many points as necessary. The scanning speed is automatically changed according to a predetermined pattern. A liquid supplying head that supplies liquid to the test sample is connected via a Teflon (registered trademark) tube to the capillary. Positions of the meniscus in the capillary are automatically detected by an optical sensor. In the above experiment, a dynamic scanning absorptometer (K350 series, type D, Kyowa Co., Ltd.) was used to measure the amount of transferred pure water or ink. The amount of transferred pure water or ink at a contact time of 100 ms or 400 ms is obtained by interpolation, using the transferred amounts measured at time points around each contact time. The measurement was performed in an environmental condition of 23° C. and 50% RH.

The grammage of a recording medium according to an embodiment of the present invention is preferably between 50 and 250 g/m$^2$. When the grammage is less than 50 g/m$^2$, the strength of the paper becomes low and the paper may be jammed in an image forming apparatus. When the grammage is more than 250 g/m$^2$, the strength of the paper becomes too high to be able to bend along the paper conveying path of an image forming apparatus and may be jammed.

Next, an exemplary ink (recording liquid) according to an embodiment of the present invention is described.

<Ink>

An ink according to an embodiment of the present invention contains at least water, a colorant, and a humectant, and may also include a penetrant, a surfactant, and other components.

The surface tension of an ink according to an embodiment of the present invention at 25° C. is preferably between 15 and 40 mN/m, and more preferably between 20 and 35 mN/m. When the surface tension of an ink is less than 15 mN/m, the wettability of the nozzle plate to the ink becomes too high. As a result, ink drops may not be formed normally, bleeding may occur on a recording medium of this embodiment, and ink jet stability may be reduced. When the surface tension of an ink is more than 40 mN/m, the penetration capability of the ink is reduced, beading may occur, and the drying time may become longer.

The surface tension of an ink is measured, for example, by a surface tensiometer (for example, CBVP-Z of Kyowa Interface Science Co., Ltd.) with a platinum plate at a temperature of 25° C.

—Colorant—

As a colorant, a pigment, a dye, and colored particles may be used individually or in combination.

As colored particles, an aqueous dispersion liquid of polymer microparticles containing at least a pigment or a dye as a colorant is preferably used.

"Containing" in this case means that a colorant is encapsulated in the polymer microparticles, a colorant is absorbed by the polymer microparticles, or both. However, a colorant may not be necessarily encapsulated in or absorbed by polymer microparticles, but may be dispersed in an emulsion as long as the resulting ink has characteristics suitable for the present invention. Any water-insoluble or poorly water-soluble colorant that can be absorbed by polymer microparticles may be used depending on the purpose.

"Water-insoluble" or "poorly water-soluble" in this case indicates that the maximum amount of a colorant that can dissolve in water at a temperature of 20° C. is less than a mass ratio of 10:100 (colorant:water). Also, "dissolve" means that no separation or sediment of a colorant is identified on the surface or bottom of the solution by eye observation.

The volume average particle diameter of a polymer microparticle (colored particle) containing a colorant is preferably between 0.01 and 0.16 μm in an ink. When the volume average particle diameter is less than 0.01 μm, the fluidity of polymer microparticles becomes very high and, as a result, bleeding may occur or the light resistance of the ink may become low. When the volume average particle diameter is more than 0.16 μm, nozzles may be clogged or color development of the ink may be inhibited.

As a colorant, for example, a water-soluble dye, an oil-soluble dye, a disperse dye, or a pigment may be used. An oil-soluble dye and a disperse dye is preferable in terms of absorbability and encapsulation. A pigment is preferable in terms of the light resistance of an image formed.

To be efficiently absorbed by polymer microparticles, the amount of a dye soluble in an organic solvent, such as a ketone solvent, is preferably 2 g/l or more, and more preferably between 20 and 600 g/l.

As a water-soluble dye, a dye categorized as an acid dye, a direct dye, a basic dye, a reactive dye, or a food dye in the Color Index may be used. Especially, a dye with high water-resistance and high light resistance is preferable.

For example, the following acid dyes and food dyes may be used: C. I. Acid Yellow 17, 23, 42, 44, 79, 142; C. I. Acid Red 1, 8, 13, 14, 18, 26, 27, 35, 37, 42, 52, 82, 87, 89, 92, 97, 106, 111, 114, 115, 134, 186, 249, 254, 289; C. I. Acid Blue 9, 29, 45, 92, 249; C. I. Acid Black 1, 2, 7, 24, 26, 94; C. I. Food Yellow 3, 4; C. I. Food Red 7, 9, 14; and C. I. Food Black 1, 2.

For example, the following direct dyes may be used: C. I. Direct Yellow 1, 12, 24, 26, 33, 44, 50, 86, 120, 132, 142, 144; C. I. Direct Red 1, 4, 9, 13, 17, 20, 28, 31, 39, 80, 81, 83, 89, 225, 227; C. I. Direct Orange 26, 29, 62, 102; C. I. Direct Blue 1, 2, 6, 15, 22, 25, 71, 76, 79, 86, 87, 90, 98, 163, 165, 199, 202; and C. I. Direct Black 19, 22, 32, 38, 51, 56, 71, 74, 75, 77, 154, 168, 171.

For example, the following basic dyes may be used: C. I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91; C. I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C. I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and C. I. Basic Black 2, 8.

For example, the following reactive dyes may be used: C. I. Reactive Black 3, 4, 7, 11, 12, 17; C. I. Reactive Yellow 1, 5, 11, 13, 14, 20, 21, 22, 25, 40, 47, 51, 55, 65, 67; C. I. Reactive Red 1, 14, 17, 25, 26, 32, 37, 44, 46, 55, 60, 66, 74, 79, 96, 97; and C. I. Reactive Blue 1, 2, 7, 14, 15, 23, 32, 35, 38, 41, 63, 80, 95.

Any pigment, either an inorganic pigment or an organic pigment, may be used depending on the purpose.

For example, the following inorganic pigments may be used: titanium oxide, iron oxide, calcium carbonate, barium sulfate, aluminum hydroxide, barium yellow, cadmium red, chrome yellow, and carbon black. Among them, carbon black is especially preferable. Carbon blacks produced by a contact method, a furnace method, or a thermal method may be used.

The following organic pigments, for example, may be used: azo pigment, polycyclic pigment, dye chelate, nitro pigment, nitroso pigment, and aniline black. Especially, azo pigment and polycyclic pigment are preferable. As an azo pigment, for example, azo lake pigment, insoluble azo pigment, condensed azo pigment, or chelate azo pigment may be used. As a polycyclic pigment, for example, phthalocyanine pigment, perylene pigment, perynone pigment, anthraquinone pigment, quinacridone pigment, dioxazine pigment, indigo pigment, thioindigo pigment, isoindolinon pigment, or quinofraron pigment may be used. As a dye chelate, for example, basic dye chelate or acid dye chelate may be used.

A pigment of any color, for example, a black pigment or a color pigment, may be used depending on the purpose. The above substances may be used individually or in combination.

For a black ink, for example, the following pigments may be used: a carbon black (C. I. Pigment Black 11) such as furnace black, lamp black, acetylene black, or channel black; a metallic pigment such as copper, iron (C. I. Pigment Black 11), or titanium oxide pigment; and an organic pigment such as aniline black.

For a yellow ink, for example, the following pigments may be used: C. I. Pigment Yellow 1 (Fast Yellow G), 3, 12 (Disazo Yellow AAA), 13, 14, 17, 23, 24, 34, 35, 37, 42 (yellow iron oxide), 53, 55, 74, 81, 83 (Disazo Yellow HR), 95, 97, 98, 100, 101, 104, 108, 109, 110, 117, 120, 128, 138, 150, 153.

For a magenta ink, for example, the following pigments may be used: C. I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B(Mn)), 49:1, 52:2, 53:1, 57:1 (Brilliant Carmine 6B), 60:1, 63:1, 63:2, 64:1, 81 (Rhodamine 6G lake), 83, 88, 92, 101 (colcothar), 104, 105, 106, 108 (cadmium red), 112, 114, 122 (dimethyl quinacridone), 123, 146, 149, 166, 168, 170, 172, 177, 178, 179, 185, 190, 193, 209, 219.

For a cyan ink, for example, the following pigments may be used: C. I. Pigment Blue 1, 2, 15 (Copper Phthalocyanine Blue R), 15:1, 15:2, 15:3 (Phthalocyanine Blue G), 15:4, 15:6 (Phthalocyanine Blue E), 16, 17:1, 56, 60, 63.

For neutral colors such as red, green, and blue, for example, the following pigments may be used: C. I. Pigment Red 177, 194, 224; C. I. Pigment Orange 43; C. I. Pigment Violet 3, 19, 23, 37; and C. I. Pigment Green 7, 36.

As a pigment, a self-dispersing pigment is preferable. A self-dispersing pigment has at least one type of hydrophilic group attached directly or via another atomic group to its surface, and is therefore stably dispersible without using a dispersing agent. Especially, an ionic self-dispersing pigment such as an anionic self-dispersing pigment or a cationic self-dispersing pigment is preferable.

The volume average particle diameter of a self-dispersing pigment is preferably between 0.01 and 0.16 μm in an ink.

Examples of anionic hydrophilic groups include —COOM, —SO3M, —PO3HM, —PO3M2, —SO2NH2, and —SO2NHCOR (in the formulas, M indicates a hydrogen atom, alkali metal, ammonium, or organic ammonium; and R indicates an alkyl group with 1-12 carbon atoms, a phenyl group with or without a substituent group, or a naphthyl group with or without a substituent group). A color pigment with —COOM or —SO3M attached to its surface is especially preferable.

Examples of alkali metals indicated by M in the hydrophilic groups include lithium, sodium, and potassium. Examples of organic ammoniums include monomethyl or trimethyl ammonium, monoethyl or triethyl ammonium, and monomethanol or trimethanol ammonium. To attach —COONa to the surface of a color pigment and thereby to obtain an anionic color pigment, the color pigment is, for example, oxidized with sodium hypochlorite, sulfonated, or reacted with diazonium salt.

As a cationic hydrophilic group, a quaternary ammonium group is preferable. Especially, quaternary ammonium groups represented by the formulas shown below are preferable. A colorant containing a pigment with any one of the quaternary ammonium groups attached to its surface is preferably used.

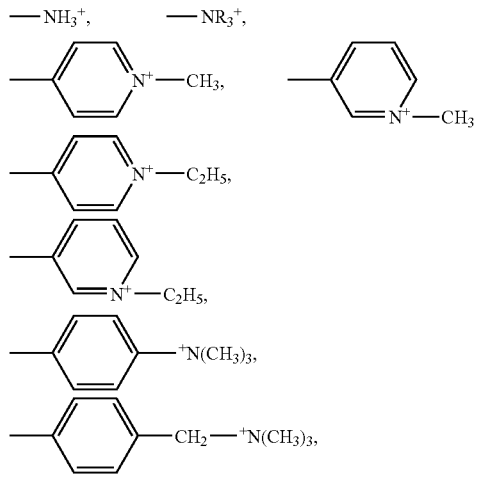

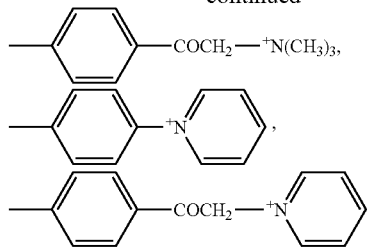

Any method may be used to produce a cationic self-dispersing carbon black having a hydrophilic group depending on the purpose. For example, to attach an N-ethyl-pyridyl group represented by the formula shown below, a carbon black is processed with 3-amino-N-ethylpyridium bromide.

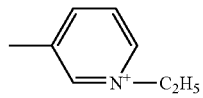

A hydrophilic group may be attached to the surface of a carbon black via another atomic group. As such an atomic group, for example, an alkyl group with 1-12 carbon atoms, a phenyl group with or without a substituent group, or a naphthyl group with or without a substituent group may be used. Exemplary combinations of a hydrophilic group and an atomic group to be attached to the surface of a carbon black include —C2H4COOM (M indicates alkali metal or quaternary ammonium), —PhSO3M (Ph indicates a phenyl group and M indicates alkali metal or quaternary ammonium), and —C5H10NH3+.

Also, a pigment dispersion liquid with a pigment dispersing agent may be used.

Natural hydrophilic polymers usable as pigment dispersing agents include vegetable polymers such as acacia gum, tragacanth gum, goor gum, karaya gum, locust bean gum, arabinogalactan, pectin, and quince seed starch; seaweed polymers such as alginic acid, carrageenan, and agar; animal polymers such as gelatin, casein, albumin, and collagen; and microbial polymers such as xanthene gum and dextran. Semisynthetic polymers usable as pigment dispersing agents include cellulose polymers such as methyl cellulose, ethyl cellulose, hydroxyethyl cellulose, hydroxypropyl cellulose, and carboxymethyl cellulose; starch polymers such as sodium carboxymethyl starch and starch glycolic acid sodium; and seaweed polymers such as sodium alginate and propylene glycol esters alginate. Synthetic polymers usable as pigment dispersing agents include vinyl polymers such as polyvinyl alcohol, polyvinylpyrrolidone, and polyvinyl methyl ether; acrylic resins such as non-crosslinked polyacrylamide, polyacrylic acid, alkali metal salt of polyacrylic acid, and water-soluble styrene acrylic resin; water-soluble styrene-maleic acid resin; water-soluble vinylnaphthalene acrylic resin; water soluble vinylnaphthalene-maleic acid resin, polyvinylpyrrolidone; alkali metal salt of β-naphthalenesulfonic acid formalin condensate; polymers having a salt of a cationic functional group such as quaternary ammonium or an amino group as a side chain, and natural polymers such as shellac. Among them, a copolymer with an introduced carboxyl group and made up of a homopolymer of acrylic acid, methacrylic acid, or styrene acrylic acid and a monomer having a hydrophilic group is especially preferable.

The weight-average molecular weight of the above copolymer is preferably between 3,000-50,000 and more preferably between 7,000-15,000.

The mass ratio of a pigment to a dispersing agent is preferably between 1:0.06 and 1:3, and more preferably between 1:0.125 and 1:3.

The mass percentage of a colorant in an ink is preferably between 6 and 15%, and more preferably between 8 and 12%. When the mass percentage of a colorant is lower than 6%, the tinting strength and the viscosity of the ink become low. Low tinting strength results in low image density and low viscosity may cause feathering and bleeding. When the mass percentage of a colorant is more than 15%, the ink dries fast and may clog the nozzles on an ink jet recording apparatus. Also, the viscosity of the ink becomes very high and, as a result, the penetration capability of the ink becomes low. Drops of such an ink with high viscosity do not spread smoothly and lead to low image density.

—Humectant—

Any humectant may be used depending on the purpose. For example, a polyol compound, a lactam compound, a urea compound, and a saccharide may be used individually or in combination.

Examples of polyol compounds include polyhydric alcohols, polyhydric alcohol alkyl ethers, polyhydric alcohol arylethers, nitrogen containing heterocyclic compounds, amides, amines, sulfur-containing compounds, propylene carbonate, and ethylene carbonate. The above substances may be used individually or in combination.

Examples of polyhydric alcohols include ethylene glycol, diethylene glycol, triethylene glycol, polyethylene glycol, polypropylene glycol, 1,3-propanediol, 1,3-butanediol, 1,4-butanediol, 3-methyl-1,3-butanediol, 1,3-propanediol, 1,5-pentanediol, 1,6-hexanediol, glycerol, 1,2,6-hexanetriol, 1,2,4-butanetriol, 1,2,3-butanetriol, and petriol.

Examples of polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of polyhydric alcohol aryl ethers include ethylene glycol monophenyl ether and ethylene glycol monobenzyl ether.

Examples of nitrogen containing heterocyclic compounds include N-methyl-2-pyrrolidone, N-hydroxyethyl-2-pyrrolidone, 2-pyrrolidone, 1,3-dimethyl imidazolidinone, and ε-caprolactam.

Examples of amides include formamide, N-methylformamide, and N,N-dimethylformamide.

Examples of amines include monoethanolamine, diethanolamine, triethanolamine, monoethylamine, diethylamine, and triethylamine.

Examples of sulfur-containing compounds include dimethyl sulfoxide, sulfolane, and thiodiethanol.

Among them, the following substances have excellent solubility and beneficial effects in preventing degradation of ink jet performance caused by evaporation of moisture and are therefore preferable: glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,3-propanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, and N-hydroxyethyl-2-pyrrolidone.

As a lactam compound, for example, at least any one of the following may be used: 2-pyrrolidone, N-methyl-2-pyrrolidone, N-hydroxyethyl-2-pyrrolidone, and ε-caprolactam.

As a urea compound, for example, at least any one of the following may be used: urea, thiourea, ethyleneurea, and 1,3-dimethyl-2-imidazolidinone. The mass percentage of a urea compound in an ink is preferably between 0.5 and 50%, and more preferably between 1 and 20%.

Examples of saccharides include monosaccharide, disaccharide, oligosaccharide (including trisaccharide and tetrasaccharide), polysaccharide, and their derivatives. Among the above saccharides, glucose, mannose, fructose, ribose, xylose, arabinose, galactose, maltose, cellobiose, lactose, sucrose, trehalose, and maltotriose are preferable; and multitose, sorbitose, gluconolactone, and maltose are especially preferable.

Polysaccharides are saccharides in a broad sense and may include substances found in nature such as α-cyclodextrin and cellulose.

Examples of saccharide derivatives include reducing sugar (for example, sugar alcohol: HOCH2(CHOH)nCH2OH [n is an integer between 2 and 5]), oxidized saccharide (for example, aldonic acid and uronic acid), amino acid, and thioacid. Among the above saccharide derivatives, a sugar alcohol is especially preferable. Examples of sugar alcohols include maltitol and sorbitol.

The mass percentage of a humectant in an ink is preferably between 10 and 50%, and more preferably between 20 and 35%. When the amount of a humectant is very small, nozzles tend to easily dry and the ink jet performance is reduced. When the amount of a humectant is too large, the viscosity of the ink may become too high.

—Penetrant—

As a penetrant, for example, a water-soluble organic solvent such as a polyol compound or a glycol ether compound may be used. Especially, a polyol compound with 8 or more carbon atoms or a glycol ether compound is preferable.

When the number of carbon atoms of a polyol compound is less than 8, the penetration capability of the ink may become insufficient. An ink with low penetration capability may smear a recording medium in duplex printing. Also, since such an ink do not spread smoothly on a recording medium, some pixels may be left blank, and as a result, the quality of characters may be reduced and the density of an image may become low.

Examples of polyol compounds with 8 or more carbon atoms include 2-ethyl-1,3-hexanediol (solubility: 4.2% (25° C.)) and 2,2,4-trimethyl-1,3-pentanediol (solubility: 2.0% (25° C.)).

Any glycol ether compound may be used depending on the purpose. Examples of glycol ether compounds include polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyhydric alcohol aryl ethers such as ethylene glycol monophenyl ether and ethylene glycol monobenzyl ether.

There is no specific limit to the amount of a penetrant in an ink. However, the amount of a penetrant is preferably between 0.1 and 20 mass percent, and more preferably between 0.5 and 10 mass percent.

—Surfactant—

Any surfactant may be used depending on the purpose. For example, an anion surfactant, a nonion surfactant, an amphoteric surfactant, or a fluorinated surfactant may be used.

Examples of anion surfactants include polyoxyethylene alkyl ether acetate, dodecylbenzenesulfonate, laurylate, and salt of polyoxyethylene alkyl ether sulfate.

Examples of nonion surfactants include acetylene glycol surfactant, polyoxyethylene alkyl ether, polyoxyethylene alkyl phenyl ether, polyoxyethylene alkyl ester, and polyoxyethylene sorbitan fatty acid ester.

Examples of acetylene glycol surfactants include 2,4,7,9-tetramethyl-5-desine-4,7-diol, 3,6-dimethyl-4-octine-3,6-diol, and 3,5-dimethyl-1-hexin-3-ol. For example, the following acetylene glycol surfactants are available as commercialized products: Surfynol 104, 82, 465, 485, TG (Air Products and Chemicals, Inc.).

Examples of amphoteric surfactants include lauryl amino propionate, lauryl dimethyl betaine, stearyl dimethyl betaine, and lauryl dihydroxyethyl betaine. More specifically, examples of amphoteric surfactants include lauryl dimethyl amine oxide, myristyl dimethyl amine oxide, stearyl dimethyl amine oxide, dihydroxyethyl lauryl amine oxide, polyoxyethylene coconut oil alkyldimethyl amine oxide, dimethylalkyl (coconut) betaine, and dimethyl lauryl betaine.

Especially, surfactants represented by chemical formulas (I), (II), (III), (IV), (V), and (VI) shown below are preferable.

$$R^1-O-(CH_2CH_2O)_hCH_2COOM \quad (I)$$

In chemical formula (I), R1 indicates an alkyl group with 6-14 carbon atoms. The alkyl group may be branched. h is an integer between 3 and 12. M indicates alkali metal ion, quaternary ammonium, quaternary phosphonium, or alkanolamine.

(II)

In chemical formula (II), R2 indicates an alkyl group with 5-16 carbon atoms. The alkyl group may be branched. M indicates alkali metal ion, quaternary ammonium, quaternary phosphonium, or alkanolamine.

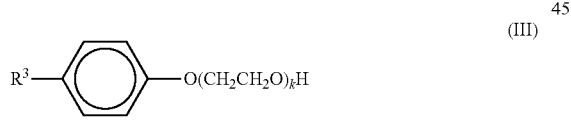
(III)

In chemical formula (III), R3 indicates a hydrocarbon radical, for example, an alkyl group with 6-14 carbon atoms. The alkyl group may be branched. k is an integer between 5 and 20.

$$R^4-(OCH_2CH_2)_jOH \quad (IV)$$

In chemical formula (IV), R4 indicates a hydrocarbon radical, for example, an alkyl group with 6-14 carbon atoms. j is an integer between 5 and 20.

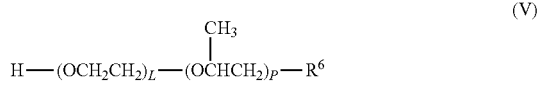
(V)

In chemical formula (V), R6 indicates a hydrocarbon radical, for example, an alkyl group with 6-14 carbon atoms. The alkyl group may be branched. L and p are integers between 1 and 20.

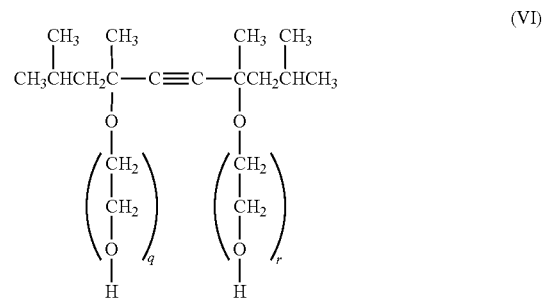
(VI)

In chemical formula (VI), q and r are integers between 0 and 40.

The surfactants represented by chemical formulas (I) and (II) are shown in free acid forms below.

(I-1): $CH_3(CH_2)_{12}O(CH_2CH_2O)_3CH_2COOH$ (I-2): $CH_3(CH_2)_{12}O(CH_2CH_2O)_4CH_2COOH$ (I-3): $CH_3(CH_2)_{12}O(CH_2CH_2O)_5CH_2COOH$ (I-4): $CH_3(CH_2)_{12}O(CH_2CH_2O)_6CH_2COOH$ (I-5):
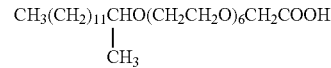

(I-6):
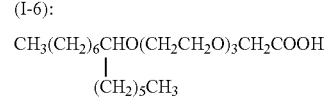

(II-1):
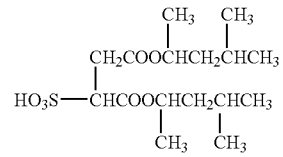

(II-2):
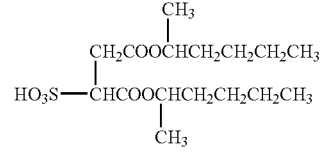

(II-3):
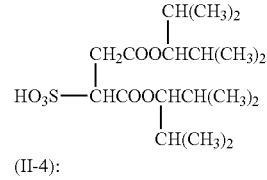

(II-4):
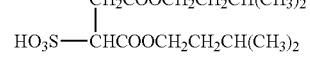

A fluorinated surfactant represented by chemical formula (A) below is preferably used.

CF3CF2(CF2CF2)$_m$-CH2CH2O(CH2CH2O)$_n$H  (A)

In chemical formula (A), m indicates an integer between 0 and 10, and n indicates an integer between 1 and 40. j is an integer between 1 and 40.

Examples of fluorinated surfactant include a perfluoroalkyl sulfonic acid compound, a perfluoroalkyl carvone compound, a perfluoroalkyl phosphoric ester compound, a perfluoroalkyl ethylene oxide adduct, and a polyoxyalkylene ether polymer compound having a perfluoroalkylether group as a side chain. Among them, a polyoxyalkylene ether polymer compound having a perfluoroalkylether group as a side chain has a low foaming property and a low fluorine compound bioaccumulation potential and is therefore especially preferable in terms of safety.

Examples of perfluoroalkyl sulfonic acid compounds include perfluoroalkyl sulfonic acid and perfluoroalkyl sulfonate.

Examples of perfluoroalkyl carvone compounds include perfluoroalkyl carboxylic acid and perfluoroalkyl carboxylate.

Examples of perfluoroalkyl phosphoric ester compounds include perfluoroalkyl phosphoric ester and salt of perfluoroalkyl phosphoric ester.

Examples of polyoxyalkylene ether polymer compounds having a perfluoroalkylether group as a side chain include a polyoxyalkylene ether polymer having a perfluoroalkylether group as a side chain, a sulfate ester salt of a polyoxyalkylene ether polymer having a perfluoroalkylether group as a side chain, and a salt of a polyoxyalkylene ether polymer having a perfluoroalkylether group as a side chain.

Counter ions of salts in the above fluorinated surfactants include Li, Na, K, NH4, NH3CH2CH2OH, NH2(CH2CH2OH)2, and NH(CH2CH2OH)3.

Fluorinated surfactants created for the present invention or those available as commercial products may be used.

Commercially available fluorinated surfactants include Surflon S-111, S-112, S-113, S-121, S-131, S-132, S-141, S-145 (Asahi Glass Co., Ltd.); Fluorad FC-93, FC-95, FC-98, FC-129, FC-135, FC-170C, FC-430, FC-431 (Sumitomo 3M Limited); Megafac F-470, F1405, F-474(Dainippon Ink and Chemicals, Incorporated); Zonyl TBS, FSP, FSA, FSN-100, FSN, FSO-100, FSO, FS-300, UR (DuPont); FT-110, FT-250, FT-251, FT-400S, FT-150, FT-400SW (NEOS Co. Ltd.); and PF-151N (Omnova Solutions, Inc.). Among them, in terms of reliability and color development, Zonyl FSN, FSO-100, and FSO (DuPont) are especially preferable.

[Other Components]

Examples of other components in an ink include, but are not limited to, a resin emulsion, a pH adjuster, an antiseptic or a fungicide, a rust inhibitor, an antioxidant, an ultraviolet absorber, an oxygen absorber, and a light stabilizer.

—Resin Emulsion—

A resin emulsion is made by dispersing resin microparticles in water as a continuous phase and may contain a dispersing agent such as a surfactant.

The mass percentage of the resin microparticles as a component of the disperse phase in a resin emulsion is preferably between 10 and 70%. The average particle diameter of the resin microparticles, especially for ink jet recording apparatuses, is preferably between 10 and 1000 nm, and more preferably between 20 and 300 nm.

Examples of resin microparticle materials include, but not limited to, acrylic resin, vinyl acetate resin, styrene resin, butadiene resin, styrene-butadiene resin, vinyl chloride resin, styrene-acrylic resin, and acrylic silicone resin. Especially, acrylic silicone resin is preferable.

Resin emulsions created for the present invention or those available as commercial products may be used.

Examples of commercially available resin emulsions include Microgel E-1002, E-5002 (styrene-acrylic resin emulsion, Nippon Paint Co., Ltd.); VONCOAT 4001 (acrylic resin emulsion, Dainippon Ink and Chemicals, Incorporated); VONCOAT 5454 (styrene-acrylic resin emulsion, Dainippon Ink and Chemicals, Incorporated); SAE-1014 (styrene-acrylic resin emulsion, ZEON Corporation); Saibinol SK-200 (acrylic resin emulsion, Saiden Chemical Industry Co., Ltd.); Primal AC-22, AC-61 (acrylic resin emulsion, Rohm and Haas Company); Nanocryl SBCX-2821, 3689 (acrylic silicone resin, Toyo Ink Mfg. Co., Ltd.); and #3070 (methyl methacrylate polymer resin emulsion, Mikuni Color Ltd.).

The mass percentage of the resin microparticles in a resin emulsion is preferably between 0.1 and 50%, more preferably between 0.5 and 20%, and further preferably between 1 and 10%. When the mass percentage of the resin microparticles is less than 0.1%, the resin emulsion may not be able to prevent clogging or may not be able to improve ink jet stability. When the mass percentage of the resin microparticles is more than 50%, the preservation stability of the ink may be reduced.

Examples of antiseptics or fungicides include 1,2-benzisothiazolin-3-on, sodium dehydroacetate, sodium sorbate, 2-pyridinethiol-1-oxide sodium, sodium benzoate, and pentachlorophenol sodium.

Any pH adjuster that does not have negative effects on an ink and adjust the pH of an ink to 7 or higher may be used depending on the purpose.

Examples of pH adjusters include amines such as diethanolamine and triethanolamine; hydroxides of alkali metals such as lithium hydroxide, sodium hydroxide, and potassium hydroxide; and carbonates of alkali metals such as ammonium hydroxide, quaternary ammonium hydroxide, quaternary phosphonium hydroxide, lithium carbonate, sodium carbonate, and potassium carbonate.

Examples of rust inhibitors include acidic sulfite, sodium thiosulfate, ammonium thiodiglycolic acid, diisopropyl ammonium nitrite, pentaerythritol tetranitrate, and dicyclohexyl ammonium nitrite.

As antioxidants, phenolic antioxidants (including hindered phenol antioxidants), amine antioxidants, sulfur antioxidants, and phosphorus antioxidants may be used.

Examples of phenolic antioxidants (including hindered phenol antioxidants) include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenbis(3-methyl-6-tert-butylphenol), 3,9-bis[1,1-dimethyl-2-[β-(3-tert-butyl-4-hydroxy-5-methylphenyl) propionyloxyt]ethyl]2,4,8,10-tetraixaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis[methylene-3(3',5'-di-tert-butyl-4'-hydroxyphenyl)propionate]methane.

Examples of amine antioxidants include phenyl-βnaphthylamine, α-naphthylamine, N,N'-di-sec-butyl-p-phenylenediamine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisol, 2,2'-methylenebis(4-methyl-6-tert-butylphenol), 4,4'-butylidenbis(3-methyl-6-tert-butylphenol), 4,4'-thiobis(3-methyl-6-tert-butylphenol), tetrakis[methylene-3(3,5-di-tert-butyl-4-dihydroxyphenyl)propionate]methane, and 1,1,3-tris(2-methyl-4-hydroxy-5-tert-butylphenyl)butane.

Examples of sulfur antioxidants include dilauryl3,3'-thiodipropionate, distearyl thiodipropionate, lauryl stearyl thiodipropionate, dimyristyl-3,3'-thiodipropionate, distearylβ,β'-thiodipropionate, 2-mercaptobenzoimidazole, and dilauryl sulfide.

Examples of phosphorus antioxidants include triphenyl phosphite, octadecyl phosphite, triisodecyl phosphite, trilauryl trithiophosphite, and trinonyl phenyl phosphate.

Examples of ultraviolet absorbers include a benzophenone ultraviolet absorber, a benzotriazole ultraviolet absorber, a salicylate ultraviolet absorber, a cyanoacrylate ultraviolet absorber, and a nickel complex salt ultraviolet absorber.

Examples of benzophenone ultraviolet absorbers include 2-hydroxy-4-n-octoxybenzophenone, 2-hydroxy-4-n-dodecyloxy benzophenone, 2,4-dihydroxybenzophenone, 2-hydroxy-4-methoxybenzophenone, and 2,2', 4,4'-tetrahydroxybenzophenone.

Examples of benzotriazole ultraviolet absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of salicylate ultraviolet absorbers include phenyl salicylate, p-tert-butylphenylsalicylate, and p-octylphenylsalicylate.

Examples of cyanoacrylate ultraviolet absorbers include ethyl-2-cyano-3,3'-diphenylacrylate, methyl-2-cyano-3-methyl-3-(p-methoxyphenyl)acrylate, and butyl-2-cyano-3-methyl-3-(p-methoxyphenyl)acrylate.

Examples of nickel complex salt ultraviolet absorbers include nickelbis(octylphenyl)sulfide, 2,2'-tiobis(4-tert-octylphalate)-n-butylaminenickel(II), 2,2'-tiobis(4-tert-octylphalate)-2-ethylhexylaminenickel(II), and 2,2'-tiobis(4-tert-octylphalate)triethanolaminenickel(II).

An ink according to an embodiment of the present invention contains at least water, a colorant, and a humectant, and may also include a penetrant, a surfactant, and other components. To prepare an ink, the above components are dispersed or dissolved in an aqueous medium. The solution may be stirred if needed. To disperse the components, for example, a sand mill, a homogenizer, a ball mill, a paint shaker, or an ultrasound dispersing machine may be used. To stir the solution, a normal stirring machine having stirring blades, magnetic stirrer, or a high-speed dispersing machine may be used.

At a temperature of 20° C., the viscosity of an ink is preferably between 1 and 30 cPs, and more preferably between 2 and 20 cPs. When the viscosity is higher than 20 cPs, ink jet stability may be reduced.

The pH of an ink is preferably between 7 and 10.

Colors of inks include, but not limited to, yellow, magenta, cyan, and black. A multi-color image can be formed with two or more color inks. A full-color image can be formed with the four color ink.

In an embodiment described above, an image processing apparatus includes a printer driver that is a program for causing a computer to perform an image processing method according to an embodiment of the present invention. However, it is possible to include a unit for performing the image processing method in an image forming apparatus. Also, it is possible to include an application specific integrated circuit (ASIC) for performing an image processing method according to an embodiment of the present invention in an image forming apparatus.

Figure 21:
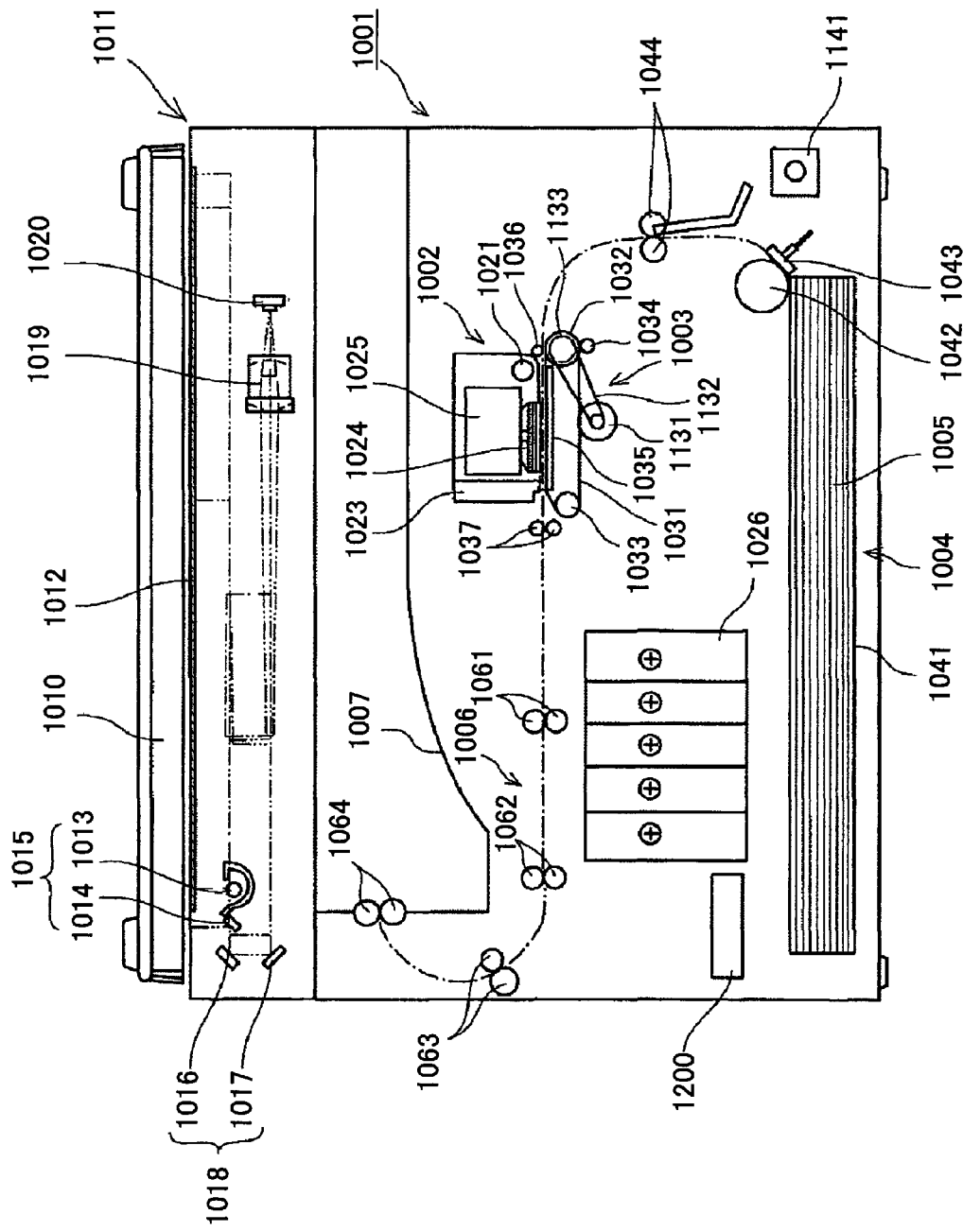
FIG. 21 is a drawing illustrating the configuration of an exemplary image forming apparatus according to an embodiment of the present invention.

An exemplary image forming apparatus (multifunction printer) having functions of an ink jet recording apparatus and a copier is described below with reference to FIG. 21. FIG. 21 is a drawing illustrating the configuration of the exemplary image forming apparatus.

The body 1001 of the exemplary image forming apparatus includes an image forming unit 1002 for forming an image and a sub-scanning conveying unit 1003 (these two components are collectively called a printer engine unit). In the exemplary image forming apparatus, recording media (paper sheets) 1005 are fed one by one from a paper feeding unit 1004 at the bottom of the body 1001, the sub-scanning conveying unit 1003 conveys the paper sheet 1005 in a position facing the image forming unit 1002, the image forming unit 1002 jets liquid drops onto the paper sheet 1005 and thereby forms (records) an image, then the paper sheet 1005 is ejected via a paper conveying/ejecting unit 1006 onto a paper catch tray 1007 at the upper side of the body 1001.

The exemplary image forming apparatus also includes an image scanning unit 1011 for scanning an image. The image scanning unit 1011 is positioned above the paper catch tray 1007 of the body 1001 and is used to input image (print data) to be formed by the image forming unit 1002. The image scanning unit 1011 includes a scanning optical system 1015 including a light source 1013 and a mirror 1014; a scanning optical system 1018 including mirrors 1016 and 1017; a contact glass 1012; a lens 1019; and an image scanning element 1020. The scanning optical system 1015 and the scanning optical system 1018 move and scan a document on the contact glass 1012; and the image scanning element 1020 receives the scanned image of the document as an image signal. The image signal is digitized, processed, and then printed. The image scanning unit 1011 also includes a pressing plate 1010 above the contact glass 1012 to hold down a document.

The exemplary image forming apparatus also includes an interface for receiving print data including data of an image to be formed by the image forming unit 1002 via a cable or a network from a host, for example, an information processing apparatus such as a personal computer for processing an image, an image reading apparatus such as an image scanner, and an imaging apparatus such as a digital camera.

The image forming unit 1002 is a shuttle type and has a similar configuration to that of an ink jet recording apparatus (image forming apparatus) described above. The image forming unit 1002 includes a carriage 1023 that is movable in the main scanning direction (the direction that is orthogonal to the paper conveying direction); a guide rod 1021 that guides the carriage 1023; and recording heads 1024 including one or more liquid drop jet heads each having arrays of nozzles for jetting liquid drops of different colors. In the image forming unit 1002, an image is formed by jetting liquid drops from the recording heads 1024 on the carriage 1023, which is being moved by a carriage scanning mechanism in the main scanning direction, while feeding the paper sheet 1005 in the paper conveying direction (sub scanning direction) by the sub scanning conveying unit 1003. The image forming unit 1002 may be configured as a line type that uses line-type heads.

The recording heads 1024 include arrays of nozzles for jetting black (K), cyan (C), magenta (M), and yellow (Y) inks. The recording heads 1024 are supplied with the color inks form sub-tanks 1025 on the carriage 1023. The sub tanks 1025 are supplied with the color inks through ink supply tubes (not shown) from detachable ink cartridges (main tanks) 1026 in the body 1001.

The sub scanning conveying unit 1003 includes a conveying roller 1032 used as a drive roller; a driven roller 1033; an endless conveyor belt 1031 stretched between the conveying roller 1032 and the driven roller 1033, which conveyor belt 1031 changes the direction of the paper sheet 1005 fed from the paper feeding unit 1004 approximately 90 degrees and then conveys the paper sheet 1005 in a position facing the image forming unit 702; a charging roller 1034, to which an AC bias for charging the surface of the conveyor belt 1031 is applied; a guide 1035 for guiding the conveyor belt 1031 in an area facing the image forming unit 1002; a pressing roller 1036 for pressing the paper sheet 1005 to the conveyor belt 1031 in a position facing the conveying roller 1032; and conveying rollers 1037 for sending out the paper sheet 1005 on which an image has been formed by the image forming unit 1002 to the paper conveying/ejecting unit 1006.

The conveyor belt 1031 of the sub scanning conveying unit 1003 is turned in the sub scanning direction by the conveying roller 1032 that is rotated by a sub scanning motor 1131 via a timing belt 1132 and a timing roller 1133.

The paper feeding unit 1004 is removable from the body 1001 and includes a paper feed tray 1041 for holding the paper sheets 1005; a paper feed roller 1042 and a friction pad 1043 for separating the paper sheets 1005 and feeding them one by one from the paper feed tray 1041; and paper conveying rollers 1044 used as resist rollers for conveying the paper sheet 1005 to the sub scanning conveying unit 1003. The paper feed roller 1042 is rotated by a paper feed motor 1141 such as an HB stepping motor via a paper feed clutch (not shown). The paper conveying rollers 1044 are also rotated by the paper feed motor 1141.

The paper conveying/ejecting unit 1006 includes paper conveying/ejecting rollers 1061 and 1062 for conveying the paper sheet 1005 on which an image has been formed; and paper conveying/ejecting rollers 1063 and paper ejecting rollers 1064 for ejecting the paper sheet 1005 to the paper catch tray 1007.

Figure 22:
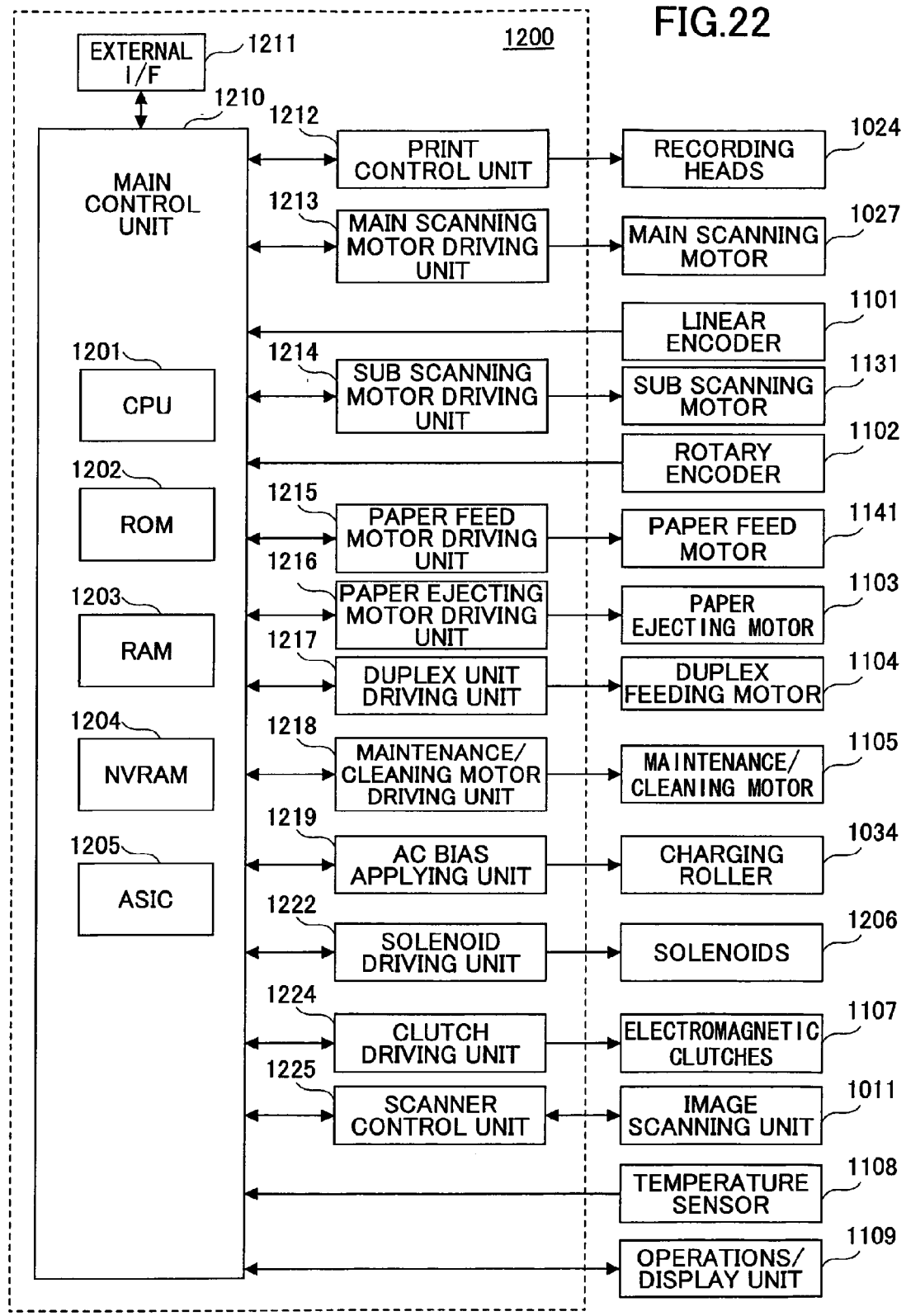
FIG. 22 is a block diagram illustrating an exemplary control unit of the exemplary image forming apparatus.

An exemplary control unit of the exemplary image forming apparatus is outlined below with reference to the block diagram shown in FIG. 22.

The control unit 1200 includes a main control unit 1210 for controlling the entire operations of the exemplary image forming apparatus. The main control unit 1210 includes a CPU 1201; a ROM 1202 for storing a program for causing the CPU 1201 to perform an image processing method according to an embodiment of the present invention, other programs, a dither matrix according to an embodiment of the present invention, and fixed data; a RAM 1203 for temporarily storing image data; a non-volatile memory (NVRAM) 1204 that retains data even when the power is off; and an ASIC 1205 that performs image processing such as halftone processing on image data.

The control unit 1200 also includes an external I/F 1211 for sending/receiving data and signals between the main control unit 1210 and a host such as an information processing apparatus used as an image processing apparatus; a print control unit 1212 including a head driver for controlling the recording heads 1024; a main scanning motor driving unit (motor driver) 1213 for driving a main scanning motor 1027 that moves the carriage 1023; a sub scanning motor driving unit 1214 for driving the sub scanning motor 1131; a paper feed motor driving unit 1215 for driving the paper feed motor 1141; a paper ejecting motor driving unit 1216 for driving a paper ejecting motor 1103 that drives rollers in the paper conveying/ejecting unit 1006; a duplex unit driving unit 1217 for driving a duplex feeding motor 1104 that drives rollers in a duplex unit (not shown); a maintenance/cleaning motor driving unit 1218 for driving a maintenance/cleaning motor 1105 that drives a recording head maintenance/cleaning mechanism (not shown); and an AC bias applying unit 1219 for applying an AC bias to the charging roller 1034.

The control unit 1200 further includes a solenoid driving unit (driver) 1222 for driving solenoids (SOL) 1206; a clutch driving unit 1224 for driving electromagnetic clutches 1107 used for paper feeding; and a scanner control unit 1225 for controlling the image scanning unit 1011.

The main control unit 1210 receives a detection signal from a temperature sensor 1108 that detects the temperature on the conveyor belt 1031. Although the main control unit 1210 also receives detection signals from other sensors, those sensors are omitted in FIG. 30. Also, the main control unit 1210 receives key inputs from and sends display information to an operations/display unit 1109 on the body 1001. The operations/display unit 1109 includes keys such as numeric keys and a print start key and displays.

Further, the main control unit 1210 receives an output signal (pulse) from a linear encoder 1101 for detecting the travel distance and the movement speed of the carriage 1023, and an output signal (pulse) from a rotary encoder 1102 for detecting the travel distance and the movement speed of the conveyor belt 1031. Based on the correlation of the output signals, the main control unit 1210 causes the main scanning motor driving unit 1213 to drive the main scanning motor 1027 and thereby to move the carriage 1023; and causes the sub scanning motor driving unit 1214 to drive the sub scanning motor 1131 and thereby to move the conveyor belt 1031 for conveying the paper sheet 1005.

An exemplary image forming process in the exemplary image forming apparatus is described below. The AC bias applying unit 1219 applies an alternating voltage, which is a high voltage of a rectangular wave having positive and negative peaks, to the charging roller 1034. The charging roller 1034 brought into contact with an insulating layer (surface layer) of the conveyor belt 1031 charges the insulating layer and forms strip-shaped positively-charged and negatively-charged areas alternately in the paper conveying direction. As a result, non-uniform electric fields are formed on the conveyor belt 1031.

The paper sheet 1005 is fed from the paper feeding unit 1004 into the space between the conveying roller 1032 and the pressing roller 1036, and then placed on the conveyor belt 1031 where non-uniform electric fields are formed. The paper sheet 1005 is instantly polarized along the directions of the electric fields, thereby attracted to the conveyor belt 1031, and conveyed as the conveyor belt 1031 rotates.

While the paper sheet 1005 is intermittently conveyed by the conveyor belt 1031, the recording heads 1024 jet drops of recording liquids according to print data and thereby forms an image on the paper sheet 1005. Then, the paper sheet 1005 is separated by a separating claw and ejected into the paper catch tray 1007 by the paper conveying/ejecting unit 1006.

When printing (or copying) an image by the exemplary image forming apparatus on a paper such as gloss paper on which liquid drops do not spread smoothly but clump together, occurrences of problems such as beading and tone jump can be reduced and the quality of a printed (copied) image can be improved by processing image data with an image processing method using a dither matrix according to an embodiment of the present invention.

EMBODIMENTS

Detailed embodiments of the present invention are described below. However, the present invention is not limited to the specifically disclosed embodiments.

Preparation Example 1

Preparation of Dispersion of Polymer Microparticles Containing Copper Phthalocyanine Pigment To prepare a dispersion of polymer microparticles containing a copper phthalocyanine pigment, the air in a 1 L flask with a mechanical stirrer, a thermometer, a nitrogen gas inlet tube, a reflux tube, and a dropping funnel was replaced sufficiently with nitrogen gas; the 1 L flask was charged with 11.2 g of styrene, 2.8 g of acrylic acid, 12.0 g of lauryl methacrylate, 4.0 g of polyethylene glycol methacrylate, 4.0 g of styrene macromer (Toagosei Co., Ltd., brand name: AS-6), and 0.4 g of mercaptoethanol; and the temperature was raised to 65° C. Then, a mixed solution of 100.8 g styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (Toagosei Co., Ltd., brand name: AS-6), 3.6 g of mercaptoethanol, 2.4 g of azobisdimethylvaleronitrile, and 18.0 g of methyl ethyl ketone was dripped into the 1 L flask for 2.5 hours.

After the dripping was completed, a mixed solution of 0.8 g of azobisdimethylvaleronitrile and 18.0 g of methyl ethyl ketone was dripped into the 1 L flask for 0.5 hours. The resulting solution was matured for 1 hour at the temperature of 65° C., 0.8 g of azobisdimethylvaleronitrile was added to the solution, and then the solution was matured further for 1 hour. After the reaction stopped, 364 g of methyl ethyl ketone was put into the 1 L flask. As a result, 800 g of polymer solution with a concentration of 50 mass % was obtained. A portion of the obtained polymer solution was dried and its weight-average molecular weight (Mw) was measured by gel permeation chromatography (standard: polystyrene, solvent: tetrahydrofuran). The weight-average molecular weight was 15,000.

Next, 28 g of the obtained polymer solution, 26 g of copper phthalocyanine pigment, 13.6 g of 1 mol/L potassium hydroxide solution, 20 g of methyl ethyl ketone, and 30 g of ion-exchanged water were mixed and stirred sufficiently. The resulting substance was kneaded 20 times using the Tripole Roll Mill (Noritake Co., Limited, brand name: NR-84A). The obtained paste was put in 200 g of ion-exchanged water and stirred. Methyl ethyl ketone and water in the liquid was distilled away by using an evaporator. As a result, 160 g of polymer microparticle dispersion with a cyan color was obtained. The solid content of the polymer microparticle dispersion was 20.0 mass %.

The average particle diameter (D50%) of the polymer microparticles in the polymer microparticle dispersion was measured with a particle size distribution analyzer (Microtrac UPA, Nikkiso Co., Ltd.). The average particle diameter was 93 nm.

Preparation Example 2

Preparation of Dispersion of Polymer Microparticles Containing Dimethyl Quinacridone Pigment A polymer microparticle dispersion with magenta color was prepared in substantially the same manner as the preparation example 1, except that C. I. Pigment Red 122 was used instead of a copper phthalocyanine pigment.

The average particle diameter (D50%) of the polymer microparticles in the polymer microparticle dispersion was measured with a particle size distribution analyzer (Microtrac UPA, Nikkiso Co., Ltd.). The average particle diameter was 127 nm.

Preparation Example 3

Preparation of Dispersion of Polymer Microparticles Containing Monoazo Yellow Pigment A polymer microparticle dispersion with a yellow color was prepared in substantially the same manner as the preparation example 1, except that C. I. Pigment Yellow 74 was used instead of a copper phthalocyanine pigment.

The average particle diameter (D50%) of the polymer microparticles in the polymer microparticle dispersion was measured with a particle size distribution analyzer (Microtrac UPA, Nikkiso Co., Ltd.). The average particle diameter was 76 nm.

Preparation Example 4

Preparation of Dispersion of Carbon Black Processed with Sulfonating Agent

To prepare a carbon black dispersion, 150 g of a commercially available carbon black pigment (Printex #85, Degussa) was mixed in 400 ml of sulfolane; the solution was micro-dispersed with a beads mill; 15 g of amidosulfuric acid was added to the solution; and then the solution was stirred for 10 hours at 140-150° C. The obtained slurry was put in 1000 ml of ion-exchanged water, and the solution was centrifuged at 12,000 rpm. As a result, a surface-treated carbon black wet cake was obtained. The obtained carbon black wet cake was dispersed again in 2,000 ml of ion-exchanged water; the pH of the solution was adjusted with lithium hydroxide; the solution was desalted/condensed using a ultrafilter; and then the solution was filtered with a nylon filter with an average pore diameter of 1 µm. As a result, a black carbon dispersion with a pigment concentration of 10 mass % was obtained.

The average particle diameter (D50%) of the microparticles in the carbon black dispersion was measured with a particle size distribution analyzer (Microtrac UPA, Nikkiso Co., Ltd.). The average particle diameter was 80 nm.

Production Example 1

Production of Cyan Ink

To produce a cyan ink, 20.0 mass % of the dispersion of polymer microparticles containing a copper phthalocyanine pigment prepared in the preparation example 1, 23.0 mass % of 3-methyl-1,3-butanediol, 8.0 mass % of glycerin, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 2-amino-2-ethyl-1,3-propanediol, and a certain amount of ion-exchanged water were mixed (100 mass % in total); and the mixture was filtered using a membrane filter with an average pore diameter of 0.8 µm.

Production Example 2

Production of Magenta Ink

To produce a magenta ink, 20.0 mass % of dispersion of polymer microparticles containing a dimethyl quinacridone pigment prepared in the preparation example 2, 22.5 mass % of 3-methyl-1,3-butanediol, 9.0 mass % of glycerin, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 1-amino-2,3-propanediol, and a certain amount of ion-exchanged water were mixed (100 mass % in total); and the mixture was filtered using a membrane filter with an average pore diameter of 0.8 μm.

Production Example 3

Production of Yellow Ink

To produce a yellow ink, 20.0 mass % of the dispersion of polymer microparticles containing a monoazo yellow pigment prepared in the preparation example 3, 24.5 mass % of 3-methyl-1,3-butanediol, 8 mass % of glycerin, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 2-amino-2-methyl-1,3-propanediol, and a certain amount of ion-exchanged water were mixed (100 mass % in total); and the mixture was filtered using a membrane filter with an average pore diameter of 0.8 μm.

Production Example 4

Production of Black Ink

To produce a black ink, 20.0 mass % of the carbon black dispersion prepared in the preparation example 4, 22.5 mass % of 3-methyl-1,3-butanediol, 7.5 mass % of glycerin, 2.0 mass % of 2-pyrrolidone, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.2 mass % of choline, and a certain amount of ion-exchanged water were mixed (100 mass % in total); and the mixture was filtered using a membrane filter with an average pore diameter of 0.8 μm.

The surface tensions and viscosities of the inks produced in the production examples 1 through 4 were measured as described below. The results are shown in table 1.

<Measurement of Viscosity>

The viscosities of the inks were measured at 25° C. with the R-500 Viscometer of Toki Sangyo Co., Ltd. (cone 1° 34'× R24, 60 rpm, after 3 minutes).

<Measurement of Surface Tension>

The static surface tensions of inks were measured at 25° C. with a surface tensiometer (CBVP-Z of Kyowa Interface Science Co., Ltd.) using a platinum plate.

TABLE 1

|  | Viscosity (mPa·s) | Surface tension (mN/m) |
| --- | --- | --- |
| Production example 1 | 8.05 | 25.4 |
| Production example 2 | 8.09 | 25.4 |
| Production example 3 | 8.11 | 25.7 |
| Production example 4 | 8.24 | 25.4 |

—Production of Base Material—

A base material with a grammage of 79 g/m² was produced using a fourdrinier from 0.3 mass % slurry made of materials in the formula below. In the size press step of the papermaking process, an oxidized starch solution was applied on the base material. The solid content of the oxidized starch on the base material was 1.0 g/m².

| Leaf bleached kraft pulp (LBKP) | 80 mass % |
| --- | --- |
| Needle bleached kraft pulp (NBKP) | 20 mass % |
| Precipitated calcium carbonate (brand name: TP-121, Okutama Kogyo Co., Ltd.) | 10 mass % |
| Aluminum sulfate | 1.0 mass % |
| Amphoteric starch (brand name: Cato3210, Nippon NSC Ltd.) | 1.0 mass % |
| Neutral rosin size (brand name: NeuSize M-10, Harima Chemicals, Inc.) | 0.3 mass % |
| Retention aid (brand name: NR-11LS, HYMO Co., Ltd.) | 0.02 mass % |

Production Example 9

Production of Recording Medium 1

A coating liquid with a solid content concentration of 60 mass % was produced by mixing 70 mass % of clay used as a pigment in which clay 97 mass % of particles have a diameter of 2 μm or smaller; 30 mass % of heavy calcium carbonate with an average particle diameter of 1.1 μm; 8 mass % of styrene-butadiene copolymer emulsion, used as an adhesive, with a glass-transition temperature (Tg) of −5° C.; 1 mass % of phosphoric esterified starch; 0.5 mass % of calcium stearate used as an aid; and water.

To produce the recording medium 1, the obtained coating liquid was applied on both sides of the above base material so that 8 g/m² of solid content of the coating liquid adheres to each side using a blade coater; and the base material was dried by hot air and supercalendered.

Production Example 10

Production of Recording Medium 2

A coating liquid with a solid content concentration of 60 mass % was produced by mixing 70 mass % of clay used as a pigment in which clay 97 mass % of particles have a diameter of 2 μm or smaller; 30 mass % of heavy calcium carbonate with an average particle diameter of 1.1 μm; 7 mass % of styrene-butadiene copolymer emulsion, used as an adhesive, with a glass-transition temperature (Tg) of −5° C.; 0.7 mass % of phosphoric esterified starch; 0.5 mass % of calcium stearate used as an aid; and water.

To produce the recording medium 2, the obtained coating liquid was applied on both sides of the above base material so that 8 g/m² of solid content of the coating liquid adheres to each side using a blade coater; and the base material was dried by hot air and supercalendered.

First Embodiment

Ink Set, Recording Medium, and Image Recording

By a conventional method, an ink set 1 made up of the cyan ink produced in the production example 1, the magenta ink produced in the production example 2, the yellow ink produced in the production example 3, and the black ink produced in the production example 4 was prepared.

Images were printed on the recording medium 1 with the ink set 1 (largest ink drop size: 18 pl) at an image resolution of 600 dpi using a 300 dpi image forming apparatus having nozzles with a nozzle resolution of 384 according to an embodiment of the present invention. The total amount of ink per unit area for a secondary color was limited to 140% and solid-color images and characters were formed.

Comparative Example 1

Ink Set, Recording Medium, and Image Recording

Images were formed in substantially the same manner as the first embodiment, except that a commercially available coated paper for offset printing (brand name: Aurora Coat, grammage=104.7 g/m², Nippon Paper Industries Co., Ltd.) was used as a recording medium.

Comparative Example 2

Ink Set, Recording Medium, and Image Recording

Images were formed in substantially the same manner as the first embodiment, except that a commercially available matt coated paper for ink jet printing (brand name: Superfine, Seiko Epson Corporation) was used as a recording medium.

Second Embodiment

Ink Set, Recording Medium, and Image Recording

Images were formed in substantially the same manner as the first embodiment, except that the recording medium 2 was used as a recording medium.

Third Embodiment

Ink Set, Recording Medium, and Image Recording

Images were formed in substantially the same manner as the first embodiment, except that a commercially available coated paper for gravure printing (brand name: Space DX, grammage=56 g/m², Nippon Paper Industries Co., Ltd.) (hereafter called a recording medium 3) was used as a recording medium.

Comparative Example 3

Ink Set, Recording Medium, and Image Recording

Images were formed in substantially the same manner as the first embodiment, except that an ink set 2 made up of the cyan ink produced in the production example 5, the magenta ink produced in the production example 6, the yellow ink produced in the production example 7, and the black ink produced in the production example 8 was used.

Comparative Example 4

Ink Set, Recording Medium, and Image Recording

Images were formed in substantially the same manner as the first embodiment, except that the ink set 2 and a commercially available coated paper for offset printing (brand name: Aurora Coat, grammage=104.7 g/m², Nippon Paper Industries Co., Ltd.) were used instead of the ink set 1 and the recording medium 1.

Comparative Example 5

Ink Set, Recording Medium, and Image Recording

Images were formed in substantially the same manner as the first embodiment, except that the ink set 2 and a commercially available matt coated paper for ink jet printing (brand name: Superfine, Seiko Epson Corporation) were used instead of the ink set 1 and the recording medium 1.

Comparative Example 6

Ink Set, Recording Medium, and Image Recording

Images were formed in substantially the same manner as the first embodiment, except that the ink set 2 and the recording medium 2 were used instead of the ink set 1 and the recording medium 1.

For each of the recording medium 1, the recording medium 2, the recording medium 3, and the recording media used in the comparative examples 4 and 5, the amount of transferred pure water and the amount of transferred cyan ink produced in the production example 1 were measured as described below using a dynamic scanning absorptometer. The results are shown in table 2.

Also, for each of the recording medium 1, the recording medium 2, and the recording media used in the comparative examples 4 and 5, the amount of transferred cyan ink produced in the production example 5 was measured as described below using a dynamic scanning absorptometer. The results are shown in table 3.

<Measurement of Amounts of Transferred Pure Water and Cyan Ink with Dynamic Scanning Absorptometer>

For each of the above recording media, the amounts of transferred pure water and cyan ink were measured using a dynamic scanning absorptometer (K350 series, type D, Kyowa Co., Ltd.). The amounts of transferred pure water and cyan ink at a contact time of 100 ms and 400 ms were obtained by interpolation, using the transferred amounts measured at time points around each contact time.

TABLE 2

| Recording media | Pure water | | Cyan ink (production example 1) | |
| --- | --- | --- | --- | --- |
| | Contact time: 100 ms | Contact time: 400 ms | Contact time: 100 ms | Contact time: 400 ms |
| Recording medium 1 | 10.1 ml/m² | 20.2 ml/m² | 7.2 ml/m² | 14.8 ml/m² |
| Recording medium 2 | 25.2 ml/m² | 28.5 ml/m² | 14.6 ml/m² | 19.4 ml/m² |
| Recording medium 3 | 10.4 ml/m² | 21.8 ml/m² | 6.4 ml/m² | 8.8 ml/m² |
| Comparative example 4 | 2.8 ml/m² | 3.4 ml/m² | 2.7 ml/m² | 3.1 ml/m² |
| Comparative example 5 | 41.0 ml/m² | 44.8 ml/m² | 38.1 ml/m² | 46.2 ml/m² |

TABLE 3

| | Cyan ink (production example 5) | |
| --- | --- | --- |
| Recording media | Contact time: 100 ms | Contact time: 400 ms |
| Recording medium 1 | 2.7 ml/m² | 4.1 ml/m² |
| Recording medium 2 | 3.8 ml/m² | 5.6 ml/m² |
| Comparative example 4 | 0.6 ml/m² | 0.9 ml/m² |
| Comparative example 5 | 31.3 ml/m² | 36.8 ml/m² |

The quality of the images printed in the first through third embodiments and the comparative examples 1 through 6 were evaluated in terms of beading, bleeding, spur marks, and glossiness. The results are shown in table 4.

<Beading>

The degree of beading in the printed green solid-color image was evaluated by eye observation according to the evaluation criteria below.

[Evaluation Criteria]

AA: No beading is observed and image is evenly printed.
BB: Beading is slightly observed.
CC: Beading is clearly observed.
DD: Excessive beading is observed.

<Bleeding>

The degree of bleeding of the printed black characters in the yellow background was evaluated by eye observation according to the evaluation criteria below.

[Evaluation Criteria]

AA: No bleeding is observed and characters are clearly printed.
BB: Bleeding is slightly observed.
CC: Bleeding is clearly observed.
DD: Excessive bleeding is observed and outlines of characters are blurred.

<Spur Marks>

The degree of spur marks in the printed images was evaluated by eye observation according to the evaluation criteria below.

[Evaluation Criteria]

AA: No spur mark is observed.
BB: Spur marks are observed slightly.
CC: Spur marks are clearly observed. DD: Excessive spur marks are observed.

<Glossiness>

The degree of glossiness of the printed images was evaluated by eye observation according to the evaluation criteria below.

[Evaluation Criteria]

AA: Images are highly glossy.
BB: Images are glossy.
CC: Images are not glossy.

TABLE 4

|  | Beading | Bleeding | Spur mark | Glossiness |
|---|---|---|---|---|
| First embodiment | BB | BB | BB | BB |
| Second embodiment | AA | AA | AA | BB |
| Third embodiment | BB | BB | BB | AA |
| Comparative Example 1 | DD | CC | DD | BB |
| Comparative Example 2 | AA | AA | AA | CC |
| Comparative Example 3 | DD | DD | DD | BB |
| Comparative Example 4 | CC | CC | CC | BB |
| Comparative Example 5 | DD | DD | DD | BB |
| Comparative Example 6 | AA | AA | AA | CC |

As described above, in each of the first through third embodiments, an ink containing at least water, a colorant, and a humectant and having a surface tension between 20 and 35 mN/m at 25° C.; and a recording medium the amount of ink transferred onto which recording medium measured by a dynamic scanning absorptometer is between 4 and 15 ml/m² at a contact time of 100 ms and between 7 and 20 ml/m² at a contact time of 400 ms were used as an ink-recording medium set. Compared with the ink-recording medium sets used in the comparative examples 1 through 6, the ink-recording medium sets used in the first through third embodiments showed excellent evaluation results in terms of beading, bleeding, spur marks, and glossiness.

According to an embodiment of the present invention, a dither matrix with a concentration type dot arrangement order is used when an output halftone level is lower than a predetermined threshold level, and a dither matrix with a dispersion type dot arrangement order is used when an output halftone level is equal to or higher than the predetermined threshold level. Such a method makes it possible to form a concentration type halftone dot pattern and screen angle, while preventing problems such as bleeding and beading caused by concentration of dots by using a dispersion type dot arrangement order for higher output halftone levels.

The present invention is not limited to the specifically disclosed embodiments, and variations and modifications may be made without departing from the scope of the present invention.

The present application is based on Japanese Priority Application No. 2005-318669, filed on Nov. 1, 2005 and Japanese Priority Application No. 2006-279108, filed on Oct. 12, 2006, the entire contents of which are hereby incorporated herein by reference.

The invention claimed is:

1. A dither matrix used in halftone processing for converting input image data having M input halftone levels into output image data having N (M>N>2) output halftone levels, wherein multiple submatrices are arranged in the dither matrix at a screen angle without overlap and without leaving space in the dither matrix so that output pixels form a halftone dot pattern or screen lines;

concentration type submatrices are used as the submatrices when an input halftone level is within a range of input halftone levels corresponding to an output halftone level that is lower than a predetermined threshold level T (N>T>1); and dispersion type submatrices are used as the submatrices when the input halftone level is within a range of input halftone levels corresponding to an output halftone level that is equal to or higher than the predetermined threshold level T; and wherein, when the input halftone level is a highest input halftone level in a range of input halftone levels corresponding to a highest output halftone level (T−1) of the concentration type submatrices, the output halftone level (T−1) is used throughout the concentration type submatrices.

2. The dither matrix as claimed in claim 1, wherein, when the input halftone level is a highest input halftone level in a range of input halftone levels corresponding to one of the N (M>N>2) output halftone levels, said one of the N (M>N>2) output halftone levels is used throughout the submatrices.

3. The dither matrix as claimed in claim 1, wherein the submatrices are arranged in such an order that dots are dispersed in the dither matrix.

4. The dither matrix as claimed in claim 1, wherein the submatrices are arranged in such an order that a threshold value in one of the submatrices does not immediately follow or precede a threshold value in another one of the submatrices which another one of the submatrices is adjacent to the one of the submatrices.

5. The dither matrix as claimed in claim 1, wherein the submatrices are arranged in such an order that the dither matrix obtains high-pass filter characteristics.

6. An image processing method of performing image processing on image data of an image, wherein the image processing includes halftone processing that is performed using a dither mask made of the dither matrix as claimed in claim 1.

7. The image processing method as claimed in claim 6, wherein, when the image is a color image having multiple color planes, a converted dither mask, which is created by converting said dither mask by one or more of conversion methods including rotation, axisymmetric inversion, and translation, is used for any one of the color planes.

8. The image processing method as claimed in claim 7, wherein a reversed dither mask, which is created by reversing a dot arrangement order of said dither mask for each output halftone level, is used for any one of the color planes.

9. The image processing method as claimed in claim 6, wherein the image is to be formed by an image forming apparatus including a recording head that jets drops of a recording liquid; and
    the image is formed on such a recording medium that the drops of the recording liquid do not spread smoothly but clump together thereon.

10. An image processing apparatus including an image processing unit configured to perform the image processing method as claimed in claim 6.

11. An image processing method of performing image processing on image data of an image, wherein
    the image processing includes halftone processing that is performed using a dither mask made of the dither matrix as claimed in claim 1;
    when the image is a color image having CMYK color planes, each of the submatrices has a shape made by combining a large rectangle and a small rectangle in such a manner that a corner of the large rectangle and a corner of the small rectangle are in contact with each other and a side of the large rectangle and a side of the small rectangle are in contact with each other; and
    a translated dither mask, which is created by translating said dither mask one or more lines in a vertical direction, is used for each of the CMYK color planes.

12. An image processing method of performing image processing on image data of an image, wherein the image processing includes halftone processing that is performed using a dither mask made of a dither matrix used in halftone processing for converting input image data having M input halftone levels into output image data having N>N>2) output halftone levels, wherein
    multiple submatrices are arranged in the dither matrix at a screen angle without overlap and without leaving space in the dither matrix so that output pixels form a halftone dot pattern or screen lines;
    concentration type submatrices are used as the submatrices when an input halftone level is within a range of input halftone levels corresponding to an output halftone level that is lower than a predetermined threshold level T (N>T>1); and
    dispersion type submatrices are used as the submatrices when the input halftone level is within a range of input halftone levels corresponding to an output halftone level that is equal to or higher than the predetermined threshold level T;
    the image is to be formed by an image forming apparatus including a recording head that jets drops of a recording liquid;
    the image is formed on such a recording medium that the drops of the recording liquid do not spread smoothly but clump together thereon;
    the recording medium is composed of a base material and at least one coating layer formed on a side of the base material;
    when the recording medium is brought into contact with the recording liquid for 100 ms in an environment of 23° C. and 50% RH, between 2 and 40 ml/m$^2$ of the recording liquid is transferred onto the recording medium; and
    when the recording medium is brought into contact with the recording liquid for 400 ms in the environment of 23° C. and 50% RH, between 3 and 50 ml/m$^2$ of the recording liquid is transferred onto the recording medium.

13. The image processing method as claimed in claim 12, wherein a solid content of the coating layer on the base material is between 0.5 and 20.0 g/m$^2$.

14. The image processing method as claimed in claim 12, wherein a grammage of the recording medium is between 50 and 250 g/m$^2$.

15. An image processing method of performing image processing on image data of an image, wherein the image processing includes halftone processing that is performed using a dither mask made of a dither matrix used in halftone processing for converting input image data having M input halftone levels into output image data having N (M>N>2) output halftone levels, wherein
    multiple submatrices are arranged in the dither matrix at a screen angle without overlap and without leaving space in the dither matrix so that output pixels form a halftone dot pattern or screen lines;
    concentration type submatrices are used as the submatrices when an input halftone level is within a range of input halftone levels corresponding to an output halftone level that is lower than a predetermined threshold level T (N>T>1); and
    dispersion type submatrices are used as the submatrices when the input halftone level is within a range of input halftone levels corresponding to an output halftone level that is equal to or higher than the predetermined threshold level T;
    the image is to be formed by an image forming apparatus including a recording head that jets drops of a recording liquid;
    the image is formed on such a recording medium that the drops of the recording liquid do not spread smoothly but clump together thereon;
    the recording medium is composed of a base material and at least one coating layer formed on a side of the base material;
    when the recording medium is brought into contact with pure water for 100 ms in an environment of 23° C. and 50% RH,. between 2 and 45 ml/m$^2$ of the pure water is transferred onto the recording medium; and
    when the recording medium is brought into contact with the pure water for 400 ms in the environment of 23° C. and 50% RH, between 3 and 50 ml/m$^2$ of the pure water is transferred onto the recording medium.

* * * * *